(12) United States Patent
Gao et al.

(10) Patent No.: US 12,370,676 B2
(45) Date of Patent: Jul. 29, 2025

(54) ROBOT STATE PLANNING METHOD BASED ON MONTE CARLO TREE SEARCH ALGORITHM

(71) Applicant: HARBIN INSTITUTE OF TECHNOLOGY, Heilongjiang (CN)

(72) Inventors: Haibo Gao, Heilongjiang (CN); Liang Ding, Heilongjiang (CN); Peng Xu, Heilongjiang (CN); Yan Liu, Heilongjiang (CN); Zhikai Wang, Heilongjiang (CN); Zongquan Deng, Heilongjiang (CN); Zhen Liu, Heilongjiang (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 275 days.

(21) Appl. No.: 18/014,989

(22) PCT Filed: Sep. 24, 2020

(86) PCT No.: PCT/CN2020/117343
§ 371 (c)(1),
(2) Date: Jan. 6, 2023

(87) PCT Pub. No.: WO2022/007199
PCT Pub. Date: Jan. 13, 2022

(65) Prior Publication Data
US 2023/0271318 A1 Aug. 31, 2023

(30) Foreign Application Priority Data
Jul. 6, 2020 (CN) .......................... 202010641009.6

(51) Int. Cl.
*B25J 9/16* (2006.01)
*G05D 1/00* (2024.01)

(52) U.S. Cl.
CPC ........... *B25J 9/1605* (2013.01); *B25J 9/1656* (2013.01); *B25J 9/1664* (2013.01)

(58) Field of Classification Search
CPC ...... B25J 9/1605; B25J 9/1656; B25J 9/1664; G05D 1/0223; G05D 1/0214; G05D 1/0221; G05D 1/0276
See application file for complete search history.

(56) References Cited

U.S. PATENT DOCUMENTS 6,764,373 B1 * 7/2004 Osawa .................... A63H 11/20
446/454
9,849,785 B1 * 12/2017 Ross ....................... B64G 1/286
(Continued)

FOREIGN PATENT DOCUMENTS

| CN | 105599821 A | 5/2016 |
| CN | 109807901 A | 5/2019 |

(Continued)

OTHER PUBLICATIONS

Posture Optimization Strategy for a Statically Stable Robot Traversing Rough Terrain; by Dominik Belter and Piotr Skrzypczy'nski; IEEE (Year: 2012).*

(Continued)

*Primary Examiner* — Sohana Tanju Khayer

(57) ABSTRACT

A robot state planning method based on a Monte Carlo tree search algorithm. The method comprises: obtaining an initial state and a target state of a robot (step 100); by using the initial state as a starting node, using a Monte Carlo tree search algorithm to expand a Monte Carlo tree until a generated target node reaches the target state (step 200); and determining a state sequence of the robot according to all nodes from the starting node to the target node (step 300). According to the solution, the overall state in the motion process is planned, and a state sequence is generated; thus, effect of front back coupling caused by planning according (Continued)

to periods can be avoided, and the passing capability of a six-foot robot in a complex terrain is improved.

9 Claims, 14 Drawing Sheets

(56) References Cited

U.S. PATENT DOCUMENTS

| | | | | |
|---|---|---|---|---|
| 11,274,929 | B1* | 3/2022 | Afrouzi | G06T 7/62 |
| 11,435,199 | B2* | 9/2022 | Lermusiaux | G01C 21/3469 |
| 2007/0200851 | A1* | 8/2007 | Said | G06T 11/206 |
| | | | | 345/440 |
| 2010/0143089 | A1* | 6/2010 | Hvass | G05D 1/027 |
| | | | | 414/754 |
| 2014/0343728 | A1* | 11/2014 | Jun | B63H 19/08 |
| | | | | 901/1 |
| 2017/0300911 | A1* | 10/2017 | Alnajem | G06Q 20/4014 |
| 2019/0321980 | A1* | 10/2019 | Gupta | B25J 9/1666 |
| 2020/0225673 | A1* | 7/2020 | Ebrahimi Afrouzi | |
| | | | | A47L 11/4011 |
| 2021/0011461 | A1* | 1/2021 | Fowler | G06N 5/01 |
| 2021/0370980 | A1* | 12/2021 | Ramamoorthy | G06F 18/214 |
| 2022/0007093 | A1* | 1/2022 | MacKay | H04B 10/038 |
| 2022/0026920 | A1* | 1/2022 | Ebrahimi Afrouzi | G06N 7/01 |
| 2022/0044138 | A1* | 2/2022 | Lin | G06N 5/01 |
| 2022/0066456 | A1* | 3/2022 | Ebrahimi Afrouzi | |
| | | | | G06F 3/04883 |
| 2022/0121884 | A1* | 4/2022 | Zadeh | G06N 3/006 |
| 2022/0197227 | A1* | 6/2022 | Woehlke | G05B 13/027 |
| 2023/0021610 | A1* | 1/2023 | Nof | G06F 11/0793 |
| 2023/0042431 | A1* | 2/2023 | Ramamoorthy | G06F 17/18 |

FOREIGN PATENT DOCUMENTS

| | | |
|---|---|---|
| CN | 110297490 A | 10/2019 |
| CN | 110989352 A | 4/2020 |
| CN | 111679679 A | 9/2020 |
| WO | 2013073803 A1 | 5/2013 |

OTHER PUBLICATIONS

International Search Report of PCT/CN2020/117343.
Written Opinion of PCT/CN2020/117343.

* cited by examiner

ROBOT STATE PLANNING METHOD BASED ON MONTE CARLO TREE SEARCH ALGORITHM

CROSS-REFERENCE TO RELATED APPLICATIONS

This application is a national stage application of PCT/CN2020/117343. This application claims priorities from PCT Application No. PCT/CN2020/117343, filed Sep. 24, 2020, and from the Chinese patent application 202010641009.6 filed Jul. 6, 2020, the content of which are incorporated herein in the entirety by reference.

TECHNICAL FIELD

The present disclosure relates to the field of robot control technology, in particular to a robot state planning method based on a Monte Carlo tree search algorithm.

BACKGROUND

As wheeled robots need to move on a continuous ground, legged robots can choose a foothold point to move in a discrete foothold point terrain, the legged robots have better passing capability in a complex outdoor environment. Among numerous legged robots, six-foot robot stand out by virtue of strong environmental adaptability and high fault tolerance, and can execute various tasks with high difficulty in some dangerous environments, so that the six-foot robots are widely applied to the fields of industry, aerospace, military, emergency rescue and relief work and the like, and have wide development prospects.

When a legged robot moves from one position to another, each position in the motion process corresponds to a state of the legged robot, wherein the state comprises current position information, pose and foothold point of the legged robot, and the motion process comprises a plurality of discrete states. According to the existing robot state planning methods, in general, when planning the state of a six-foot robot, only the next state of the six-foot robot in the current motion cycle is planned, and after the six-foot robot completes the current motion cycle and moves to the next state, the target state of the next motion cycle is planned, but the state planning process of the six-foot robot is a Markov process, the previous state planning results will have a certain impact on the subsequent state planning decisions, and the coupling results of the previous state planning results will affect the capacity of the six-foot robot in complex terrain.

SUMMARY

A problem to be solved by the present disclosure is how to process a coupling relationship between states so as to reduce the influence of the states of a six-foot robot in a previous motion cycle on subsequent state planning, and improve the passing capability of a six-foot robot in a complex terrain.

In order to solve the above-mentioned problems, the present disclosure provides a robot state planning method based on a Monte Carlo tree search (MCTS) algorithm, and particularly comprises a robot state planning method based on MCTS, an apparatus and a storage medium.

In a first aspect, the present disclosure provides a robot state planning method based on a Monte Carlo tree search algorithm, which comprises:

acquiring an initial state and a target state of a robot;
taking the initial state as a starting node, extending the Monte Carlo tree using a Monte Carlo tree search algorithm until the generated target node reaches the target state; and
determining a state sequence of the robot from all nodes of the starting node to the target node.

In a second aspect, the present disclosure provides a six-foot robot comprising a memory and a processor.

The processor is used for executing a computer program stored in the memory to perform the following operations:

acquiring an initial state and a target state of a robot;
taking the initial state as a root node, extending the Monte Carlo tree using a Monte Carlo tree search algorithm until the generated target node reaches the target state; and
determining a state sequence for the robot from all nodes from the root node to the target node.

In a third aspect, the present disclosure provides a non-transitory computer-readable storage medium having stored thereon a computer program which, when executed by a processor, performs the following operations:

acquiring an initial state and a target state of a robot;
taking the initial state as a root node, extending the Monte Carlo tree using a Monte Carlo tree search algorithm until the generated target node reaches the target state; and
determining a state sequence for the robot from all nodes from the root node to the target node.

In a fourth aspect, the present disclosure provides a robot state planning apparatus based on a Monte Carlo tree search algorithm, which comprises:

an acquisition module for acquiring an initial state and a target state of the robot;
a processing module for taking the initial state as a starting node, and extending the Monte Carlo tree using a Monte Carlo tree search algorithm until the generated target node reaches the target state; and
an output module for determining a state sequence of the robot according to all nodes from the starting node to the target node.

The advantageous effects of the robot state planning method based on a Monte Carlo tree search algorithm of the present disclosure are: a pre-set initial state is regarded as a starting node of a Monte Carlo tree, a Monte Carlo tree search algorithm is used to construct and extend the Monte Carlo tree, so that the nodes of the Monte Carlo tree continuously approach a pre-set target state, when the nodes reach the target state, all the nodes from the target state to the initial state are traversed, and all the nodes are arranged in sequence according to an order from the initial state to the target state, so that a state sequence from the initial state to the target state of the six-foot robot can be obtained. In the technical solution of the present application, a Monte Carlo tree search algorithm is used to plan the overall state of the motion process, and a state sequence of the whole motion process is generated, which can avoid the front back coupling effect caused by the periodic planning, reduce the effect of the movement of the six-foot robot in the previous motion cycle on the subsequent movement, and improve the passing capability of the six-foot robot in complex terrain.

DETAILED DESCRIPTION OF THE DISCLOSURE

To make the above objects, features and advantages of the present disclosure more apparent, a detailed description of specific embodiments of the present disclosure will be made with reference to the accompanying drawings.

It is noted that the terms "first", "second", and the like in the description and in the claims of the present disclosure and in the above-described drawings are used for distinguishing between similar objects and not necessarily for describing a particular sequential or chronological order. In the description of the present disclosure, "a plurality of" refers to at least two, e.g. two, three, etc. unless specifically and specifically limited otherwise. It is to be understood that the data so used are interchangeable under appropriate circumstances such that the embodiments of the disclosure described herein are capable of operation in sequences other than those illustrated or otherwise described herein. The method for robot state planning based on Monte Carlo tree search algorithm (MCTS) of the present application is described in detail by taking a six-foot robot as an example in the embodiments of the present application, and specifically relates to a robot state planning method, apparatus and storage medium based on MCTS.

Figure 1A:
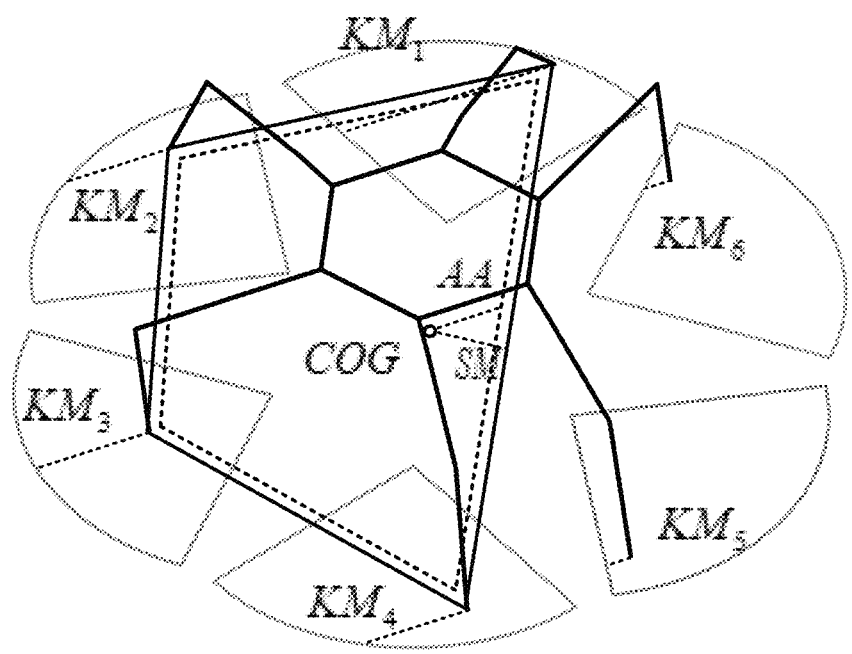
FIGS. 1A-1B are schematic views showing a structure of a six-foot robot according to an embodiment of the present disclosure.
Figure 1B:
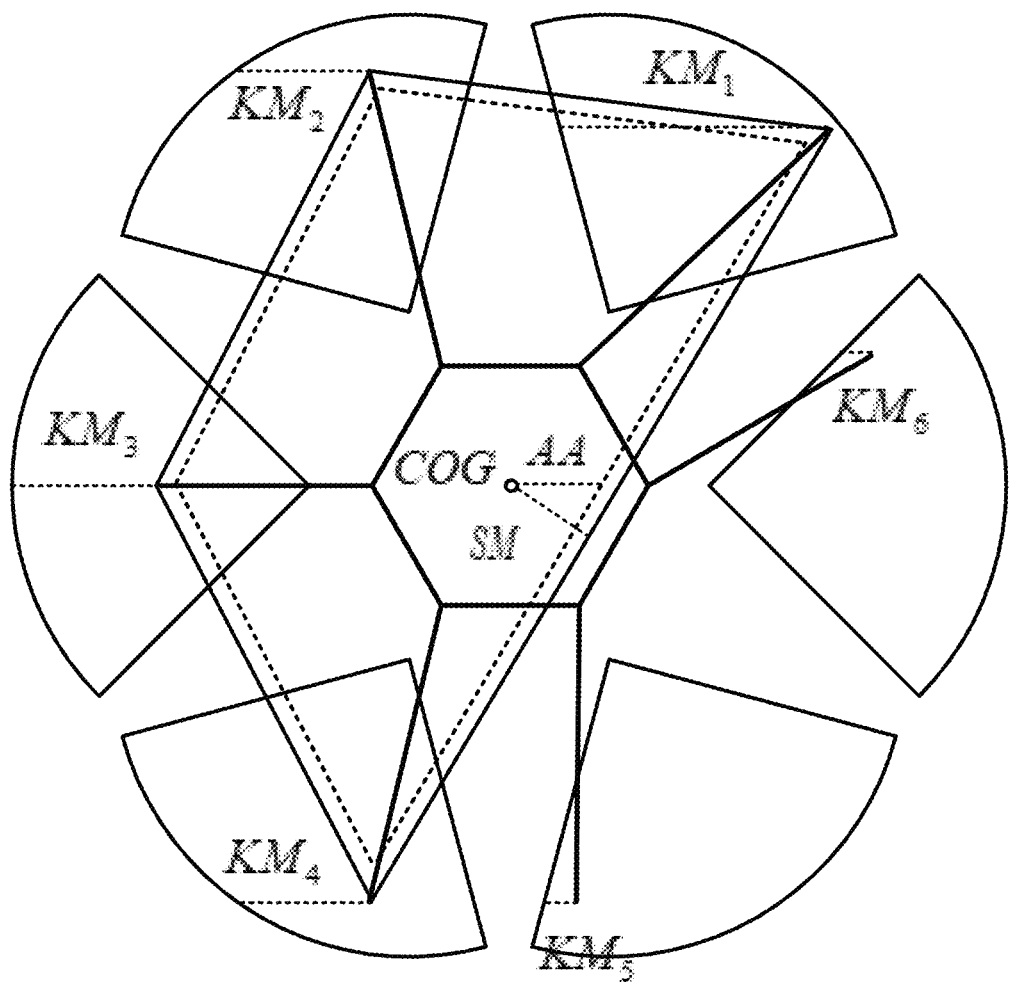

First, information such as the state of the six-foot robot will be described in detail, as shown in FIGS. 1A-1B, FIG. 1 (a) is a schematic diagram of the structure of the six-foot robot, and FIG. 1 (b) is a schematic diagram of a top view of the structure of the six-foot robot. The state of the six-foot robot is represented as $\Phi := <_B^W R,\ _B^W r,\ c_F,\ t_F,\ _F^W r>$: each node of the Monte Carlo tree corresponds to a state of the six-foot robot, wherein $_B^W R \in SO(3)$ represents a rotation matrix from a body coordinate system of the six-foot robot to a world coordinate system, $_B^W r \in R^3$ represents an absolute position of the body of the robot in the world coordinate, $c_F$ represents a support state vector of the robot transferring from the current state to the next state, $t_F$ represents a leg state vector of the six-foot robot transferring from the current state to the next state, and $_F^W r_i \in R^3$ represents a foothold point position of any swinging leg$^i$ of the six-foot robot in the next state in the world coordinate system, and the foothold point positions of all the swinging legs constitute the footing vector $_F^W r$ of the swinging leg.

The six-foot robot shall keep static stability during the motion process, and the conditions for keeping static stability include: the number of support legs of the six-foot robot is greater than or equal to three, and the center of gravity of the machine body is within the support polygon, and the stability margin of the calibration can be satisfied. Specifically, the support polygon is a polygon formed by connecting lines at the foot ends of the support legs, the stability margin represents the distance between the projection of the center of gravity of the machine body on the support polygon and any one side of the support polygon, and the six-foot robot satisfies the calibrated stability margin, that is, the stability margin is greater than a pre-set threshold value, and the threshold value is set to $BM_0$, and a typical value of the threshold value is 0.1 m.

Static stability margin: SM represents the static stability margin of a six-foot robot. The static stability margin, which may also be referred to as an absolute static stability margin, represents the shortest distance of the body center of gravity of the six-foot from the projection of the support polygon to the edge of the support polygon, and as shown in FIGS. 1A-1B, the six-foot robot requires SM to be greater than $BM_0$ to remain statically stable.

Figure 2:
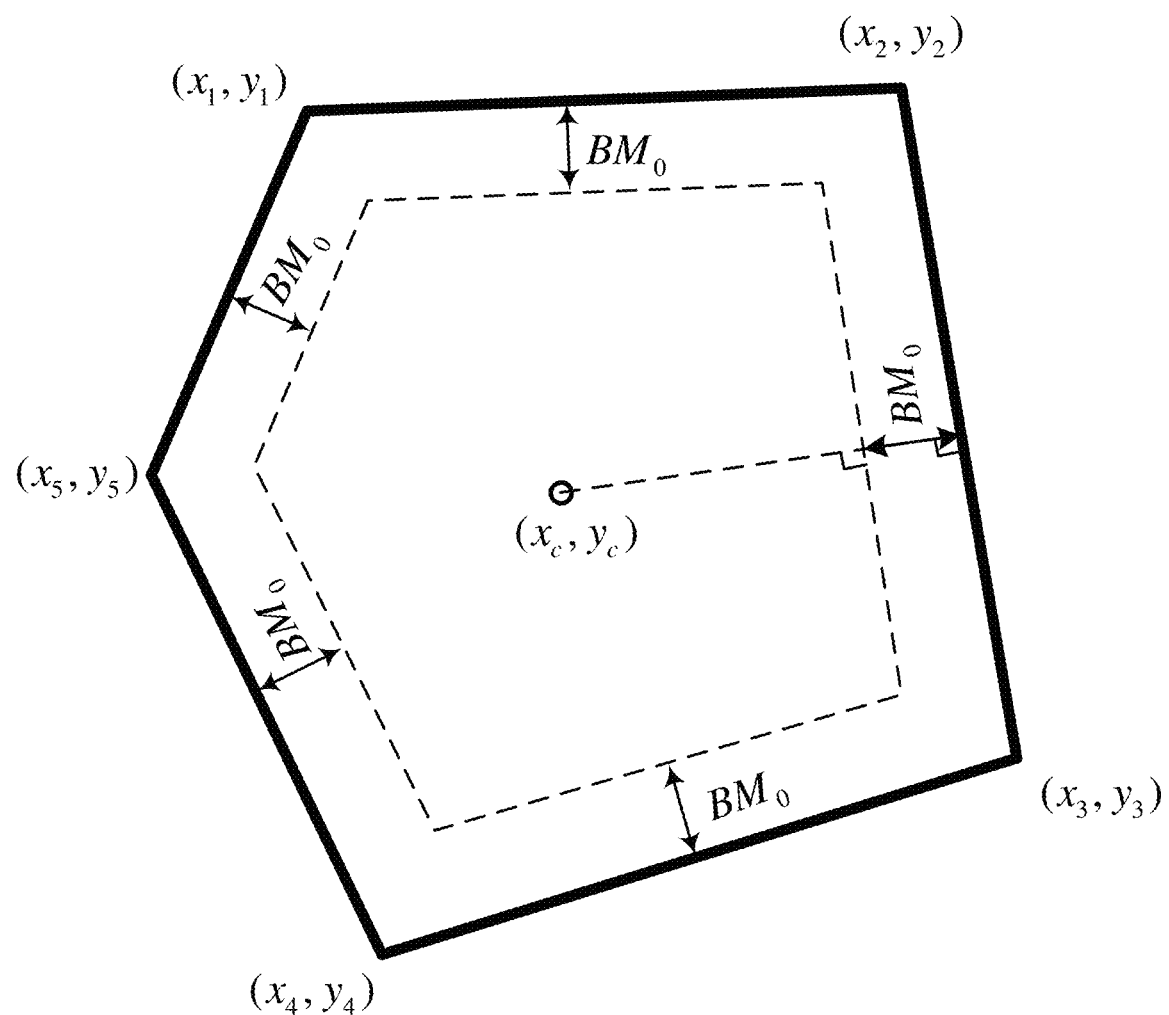
FIG. 2 is a schematic view of a support polygon and a scaled support polygon according to an embodiment of the present disclosure.

Scaled support polygon: the support polygon is a convex polygon formed by sequentially connecting the foot end of the support leg of the six-foot robot with an intersection point on a horizontal plane, such as a solid polygon shown in FIGS. 1 and 2. The support polygon is used to measure the stability of the robot. A six-foot robot is said to be stable if the horizontal projection of the robot's center of gravity falls within the supporting polygon. When the six-foot robot moves, if the center of gravity is too close to the edge of the supporting polygon, it is still dangerous and easy to roll over, so a certain margin is needed in the planning process. In the present application, the support polygons are equidistantly scaled in the direction of the center of gravity to form a scaled support polygon.

First, the centroid of the polygon is calculated, and in FIG. 2, the solid polygon is a support polygon with the number of support legs being 5, and the dotted polygon is a scaled support polygon. The coordinates of the center of mass of the support polygon is defined as $(x_c, y_c)$, and the coordinates of the foot end of the support leg is defined as $(x_i, y_i)(i=1, 2 \ldots n)$, wherein for a six-foot robot n being less than or equal to 6, the calculation formula of the center of mass of the six-foot robot is as follows:

$$x_c = \frac{1}{6A}\sum_{i=1}^{n}(x_i + x_{i+1})(x_i \cdot y_{i+1} - x_{i+1}y_i),$$

$$y_c = \frac{1}{6A}\sum_{i=1}^{n}(y_i + y_{i+1})(x_i \cdot y_{i+1} - x_{i+1}y_i).$$

Wherein A represents the region of the support polygon and is determined by the following formula:

$$A = \frac{1}{2}\sum_{i=1}^{n}(x_i \cdot y_{i+1} - x_{i+1}y_i).$$

After determining the position of the center of mass of the polygon, the support polygon is reduced equidistantly in the direction of the center of gravity to obtain a scaled support polygon represented by a broken line polygon in FIG. 2. $BM_0$ The larger the support polygon is, the higher the stability of the six-foot robot is in motion, but the selection of the foothold point and the support state is less, and the passing capability of the six-foot robot in complex terrain is reduced.

Support status vector: $c_F := [s_1, s_2, s_3, s_4, s_5, s_6] \in R^{1 \times 6}$ represents the support state vector of the six-foot robot moving from the current state to the next state. $s_i$ represents whether any leg i of the six-foot robot is a support leg or a swinging leg, and if the leg i is a support leg, then the value $s_i$ is 1; if the leg i is a swinging leg, then the value $s_i$ is 0. A support state of the six-foot robot is determined in a pre-set support state table, and if six legs of the six-foot robot are sequentially ordered, the support leg is represented by 1, and the swinging leg is represented by 0, then a support state table containing all possible support states is shown in table 1:

TABLE 1 support state table

| State sequence number | Support state | Support schematic diagram |
|---|---|---|
| 1 | 110111 | |
| 2 | 011101 | |
| 3 | 111010 | |
| 4 | 010011 | |
| 5 | 101010 | |
| 6 | 010101 | |
| 7 | 101011 | |

TABLE 1-continued support state table

| State sequence number | Support state | Support schematic diagram |
|---|---|---|
| 8 | 110101 | |
| 9 | 110110 | |
| 10 | 100101 | |
| 11 | 110011 | |
| 12 | 100110 | |
| 13 | 001011 | |
| 14 | 110100 | |
| 15 | 101101 | |
| 16 | 110010 | |
| 17 | 011001 | |
| 18 | 101001 | |
| 19 | 111110 | |
| 20 | 101110 | |
| 21 | 001101 | |
| 22 | 011011 | |
| 23 | 011110 | |
| 24 | 101111 | |
| 25 | 111100 | |

TABLE 1-continued support state table

| State sequence number | Support state | Support schematic diagram |
|---|---|---|
| 26 | 100111 |  |
| 27 | 010111 |  |
| 28 | 101100 |  |
| 29 | 011010 |  |
| 30 | 011111 |  |
| 31 | 010110 |  |
| 32 | 111101 |  |
| 33 | 001111 |  |
| 34 | 111011 |  |
| 35 | 111111 |  |
| 36 | 111001 |  |
| 37 | 000111 |  |
| 38 | 001110 |  |
| 39 | 011100 |  |
| 40 | 100011 |  |
| 41 | 110001 |  |
| 42 | 111000 |  |

In table 1, the support state shows the state of each leg in this state. The polygon in the schematic diagram of the support state is a support polygon, and the dot is a projection of the body center of gravity in the support polygon.

Leg status vector: $t_F:=[f_1, f_2, f_3, f_4, f_5, f_6] \in R^{1 \times 6}$ represents a leg error state vector six-foot robot moving from the current state to the next state. $f_i$ represents whether any leg i of the six-foot robot is a normal leg or a wrong leg, and if the leg i is a wrong leg, then the value $f_i$ is 1; if the leg i is a normal working leg, then the value $f_i$ is 0.

Wrong leg: included are, e.g. legs that do not have a foothold point due to ground environment and legs that breakdown. When a leg is a wrong leg, it is used as a swinging leg during motion process.

Kinematic margin: $K_i(P)$ represents kinematic margin of the foot end of any leg i of the six-foot robot, $K_i(P)=KM_i$, wherein, $KM_i$ represents the distance from the foot end to the workspace boundary in the opposite direction of the six-foot robot body movement. The legs i cannot go beyond the workspace boundary, because the legs are locked and cannot continue to work.

Allowable body advance: AA represents the allowable body advance of the six-foot robot, and the allowable body advance is the distance that the body COG of the six-foot robot moves to the side of the scaled support polygon along the body advance direction.

Maximum moving step length: MSL is the maximum moving step length of the six-foot robot, and the maximum moving step length is the maximum distance that the six-foot robot can move along the advancing direction on the basis of keeping stability, which can be determined by the following formula: $MSL=\min(KM_i, AA)$.

Figure 3:
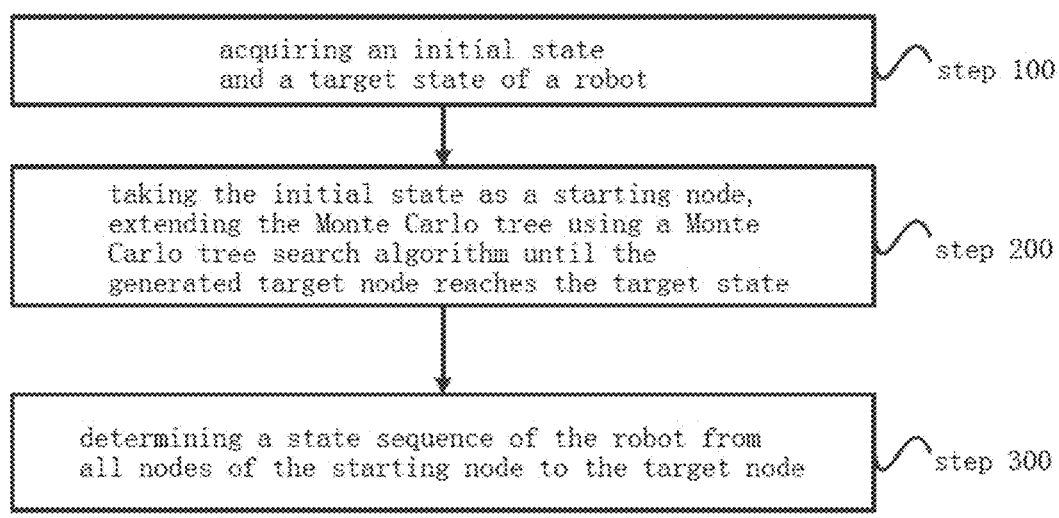
FIG. 3 is a flow diagram of a robot state planning method based on a Monte Carlo tree search algorithm according to an embodiment of the present disclosure.

As shown in FIG. 3, an embodiment of the present disclosure provides a robot state planning method based on a Monte Carlo tree search algorithm, which comprises:

step 100, acquiring an initial state and a target state of a robot; and step 200, taking the initial state as a starting node, extending the Monte Carlo tree using a Monte Carlo tree search algorithm until the generated target node reaches the target state.

In particular, the Monte Carlo tree search algorithm is a method to find the best decision in a specific leader by extracting random samples in the decision space and constructing the Monte Carlo tree according to the structure.

Step 300, determining a state sequence of the robot from all nodes of the starting node to the target node.

In the embodiment, the advantageous effects of the robot state planning method based on a Monte Carlo tree search algorithm of the present disclosure are: a pre-set initial state is regarded as a starting node of a Monte Carlo tree, a Monte Carlo tree search algorithm is used to construct and extend the Monte Carlo tree, so that the nodes of the Monte Carlo tree continuously approach a pre-set target state, when the nodes reach the target state, all the nodes from the target state to the initial state are traversed, and all the nodes are arranged in sequence according to an order from the initial state to the target state, so that a state sequence from the initial state to the target state of the six-foot robot can be obtained. In the embodiment, a Monte Carlo tree search algorithm is used to plan the overall state of the motion process, and a state sequence of the whole motion process is generated, which can avoid the front back coupling effect caused by the periodic planning, reduce the effect of the movement of the six-foot robot in the previous motion cycle on the subsequent movement, and improve the passing capability of the six-foot robot in complex terrain.

Note that all states in the state sequence are discrete states.

Preferably, taking the initial state as a root node, extending the Monte Carlo tree using a Monte Carlo tree search algorithm until the generated target node reaches the target state comprises:

step 211, taking the starting node as a root node, recursively selecting a child node starting from the root node in the established current Monte Carlo tree until the leaf node is reached.

Specifically, in an established Monte Carlo tree, a child node of a root node is selected first, and then a child node of the child node is selected, and in succession circulated until a leaf node of the Monte Carlo tree is reached.

Step 212, determining whether the state corresponding to the leaf node is the target state, and if so, proceeding to step 216; if not, proceed to step 213.

In step 213, randomly creating an extended node after the leaf node.

Specifically, a node in a Monte Carlo tree is divided into two types, one is a fully extended node, indicating that all child nodes of the node have been visited, and the other is an incompletely extended node, indicating that the node has at least one child node that has not been visited. Each state of the robot corresponds to a next state set, a node in the Monte Carlo tree also corresponds to a child node set, and a node which is not fully extended can also be represented as a difference set of the next state set of the state corresponding to the node and the child node set of the node being non-empty, that is, all the states in the next state set of the state corresponding to the node are not all displayed in the Monte Carlo tree.

An unvisited node is randomly created after a leaf node, wherein the unvisited node is an extended node, and a state can be randomly selected from the next state set corresponding to the leaf node as the extended node.

Step 214, starting to loop state simulation from the extended node until the simulated state satisfies a pre-set first termination condition.

It should be noted that the extended nodes will be added to the Monte Carlo tree, while the nodes obtained by simulation are not added to the Monte Carlo tree, which is a virtual simulation process.

Step 215, tracing back and updating the extended node to all nodes of the root node according to the simulation result, and returning to step 211;

Specifically, the simulation result includes success or failure, etc., for example, the simulated state reaches the target state, or the target state is not reached, and the information about all nodes from extended node to the root node is updated according to the result. At the beginning of the search, there is only a root node, and all the child nodes of the root node are unvisited nodes, then a child node is randomly selected as an extended node for simulation, and the child node and the root node are retroactively updated according to the simulation result, and the above-mentioned process is repeated by repeatedly selecting un-extended nodes, and then a Monte Carlo tree can be constructed.

Step 216, let the leaf node be the target node, traversing the target node to all nodes of the starting node.

Specifically, tracing back from the leaf node, traversing the leaf node to all the nodes of the starting node, arranging all the traversed nodes in sequence according to the order from the starting node to the leaf node, and composing a sequence to obtain the state sequence of the robot.

In the preferred embodiment, the Monte Carlo tree search algorithm can quickly generate the state sequence to reach the target state in the complex state information during the motion process, and the passing capability of six-foot robot in complex terrain can be significantly improved.

Preferably, each node corresponds to two parameters of the total number of visits and a simulation success parameter, and the step 211 comprises:

For any node in the Monte Carlo tree, the score of each child node of the node in the Monte Carlo tree is respectively determined according to an upper bound confidence bound (UCB) algorithm, wherein the upper bound confidence bound algorithm is represented by a first formula, and the first formula is:

$$UCB = \frac{N_{success}(\Phi'_j)}{N_{visit}(\Phi'_j)} + C \cdot \sqrt{\frac{2\ln N_{visit}(\Phi_j)}{N_{visit}(\Phi'_j)}},$$

Wherein $\Phi_j$ is any node in the Monte Carlo tree, $\Phi'_j$ is a child node of the node $\Phi_j$, UCB is the score of the child node $\Phi'_j$, $N_{visit}(\Phi_j)$ is the total number of times the node $\Phi_j$ is visited, $N_{visit}(\Phi'_j)$ is the total number of times the child node $\Phi'_j$ is visited, $N_{success}(\Phi'_j)$ is the simulation success parameter of the child node $\Phi'_j$, and C is a balance coefficient.

Specifically, with regard to any node $\Phi_j$, a set composed of a node $\Phi_j$ and a descendant node thereof is made $S_j$ as follows: the simulation success parameter is the number of nodes in the set $S_j$ of which the simulation result is successful; with regard to any node, state simulation is performed cyclically from the node; if the simulation distance is greater than a pre-set simulation view, the simulation result of the node is successful; otherwise, the simulation result of the node is failed. The smaller the value C is, the faster the search speed is, the more the nodes selected tend to have better historical scores, and the larger the value C is, the slower the search speed is, the more the breadth search is.

Starting from the root node, cyclically selecting the child node with the largest score until the leaf node is reached.

Specifically, starting from the root node, the score of each child node of the root node is calculated, the child node with the highest score is selected, and then the score of each child node of the child node is calculated, and so on.

In the preferred embodiment, the upper bound confidence bound algorithm is able to balance between exploration and utilization, by leveraging past expansion and simulation experience, and exploring undeployed nodes, able to actively explore better passing capability paths while maintaining expansion speed.

Preferably, each node respectively corresponds to a child node set, wherein the child node set comprises a plurality of child nodes, and each simulated state corresponds to an advance step length and a simulation distance of the robot, and the step 214 comprises:

iterating a random simulation algorithm cyclically according to the extended node until a simulation state obtained by simulation satisfies the first termination condition, wherein the random simulation algorithm comprises randomly determining a child node of a current node in the child node set of the current node.

Wherein each of the simulation states respectively corresponds to a simulation distance and a moving step length of the robot, and the simulation distance is the number of all states between the simulation state and the extended node.

Specifically, when a random simulation algorithm is cyclically iterated according to an extended node, each state corresponds to an action set, and the action set comprises a plurality of actions of a robot, including body actions of a six-foot robot and actions of various legs, etc. Assuming that any state $\Phi_0$ is an extended node, an action is randomly selected from the action set $A(\Phi_0)$ of the state $\Phi_0$, the selected action is regarded as a, $a \in A(\Phi_0)$, and then the next state $\Phi_n$ of the six-foot robot after the action a can be regarded as $\Phi_n = f(\Phi_0, a)$, $\Phi_n \in AS(\Phi_0)$ $AS(\Phi_0)$ is the next alternative state set of the state $\Phi_0$.

Figure 4:
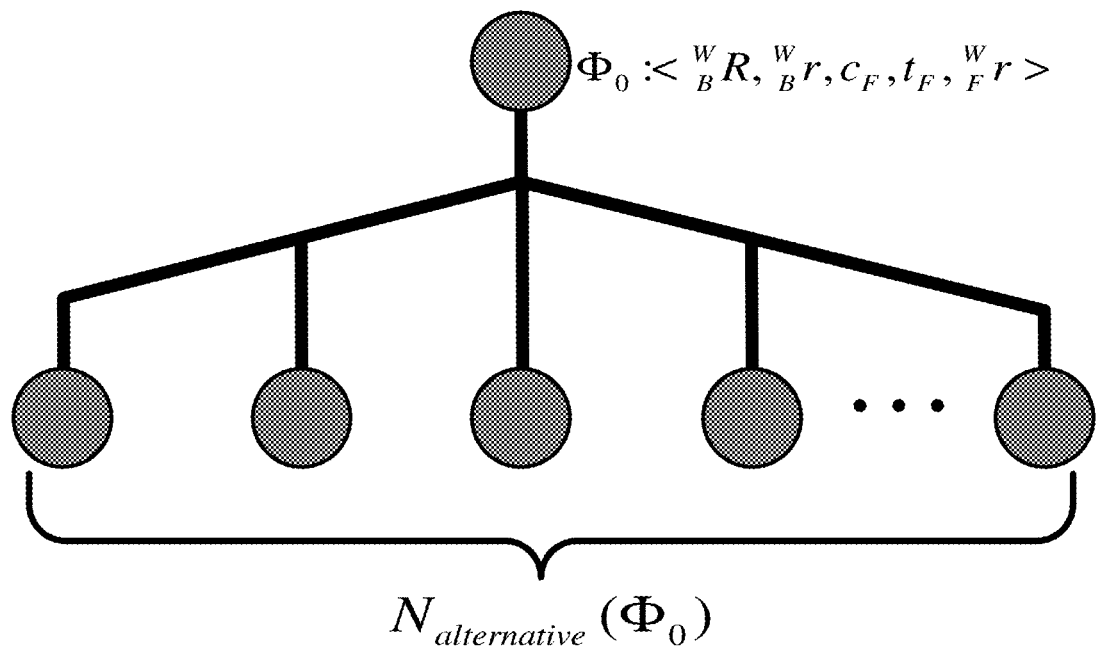
FIG. 4 is a state space diagram of a state $\Phi_0$ according to an embodiment of the present disclosure.
Figure 5A:
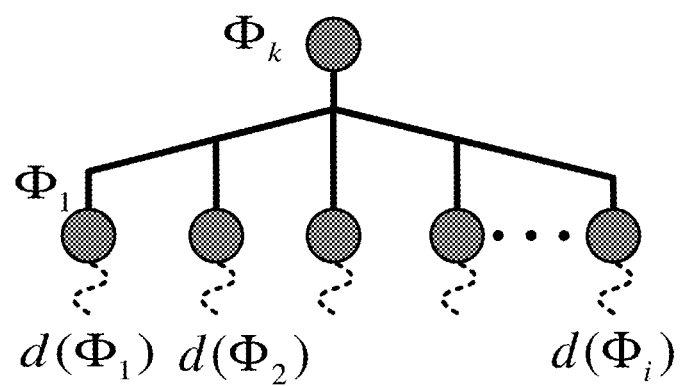
FIGS. 5A-5E are flow diagrams of an extended Monte Carlo tree according to an embodiment of the present disclosure.
Figure 5B:
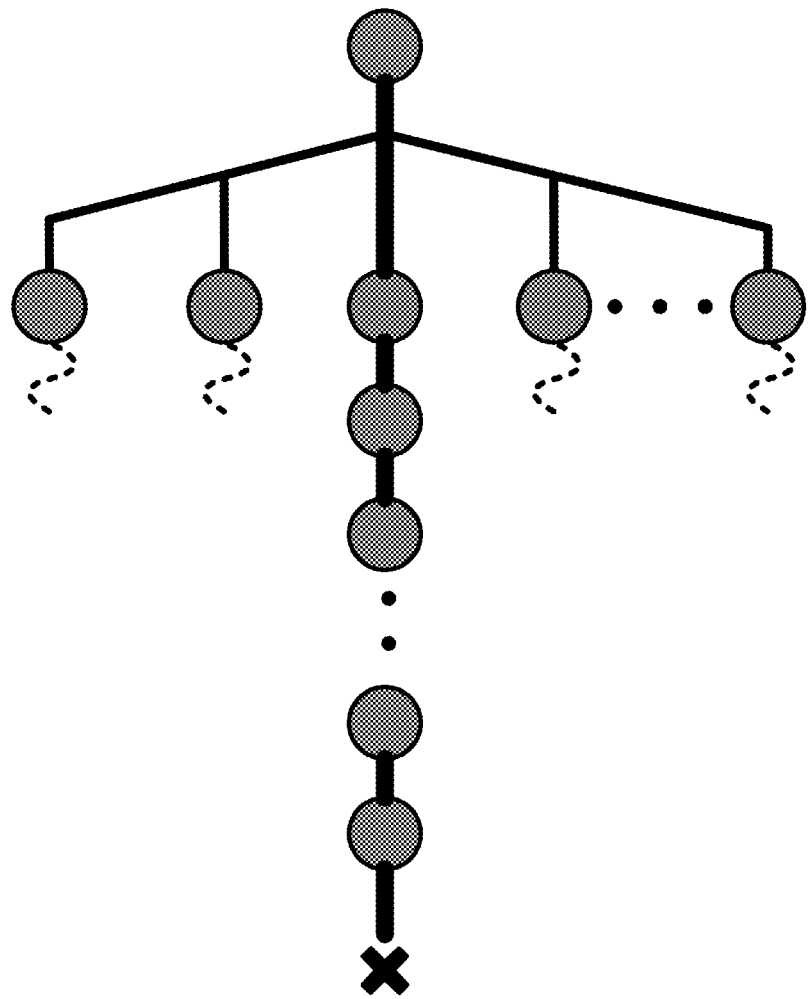
Figure 5C:
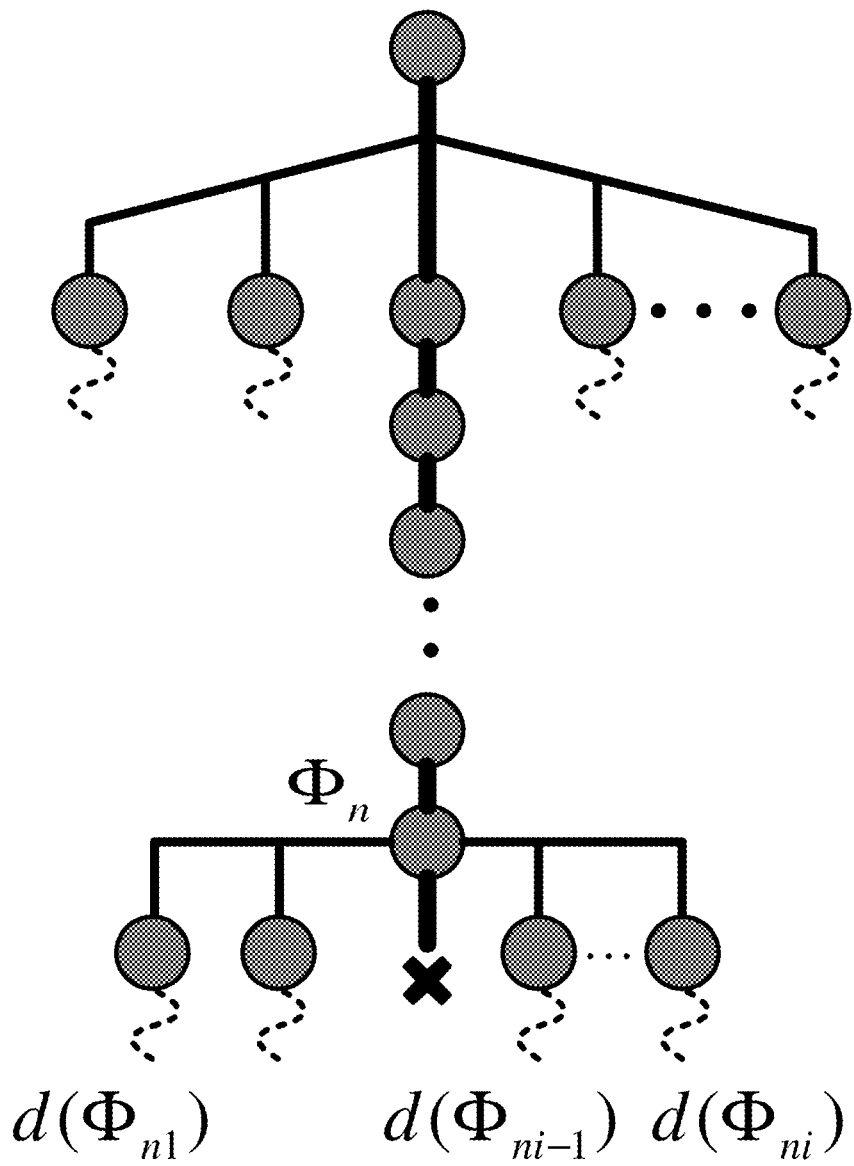
Figure 5D:
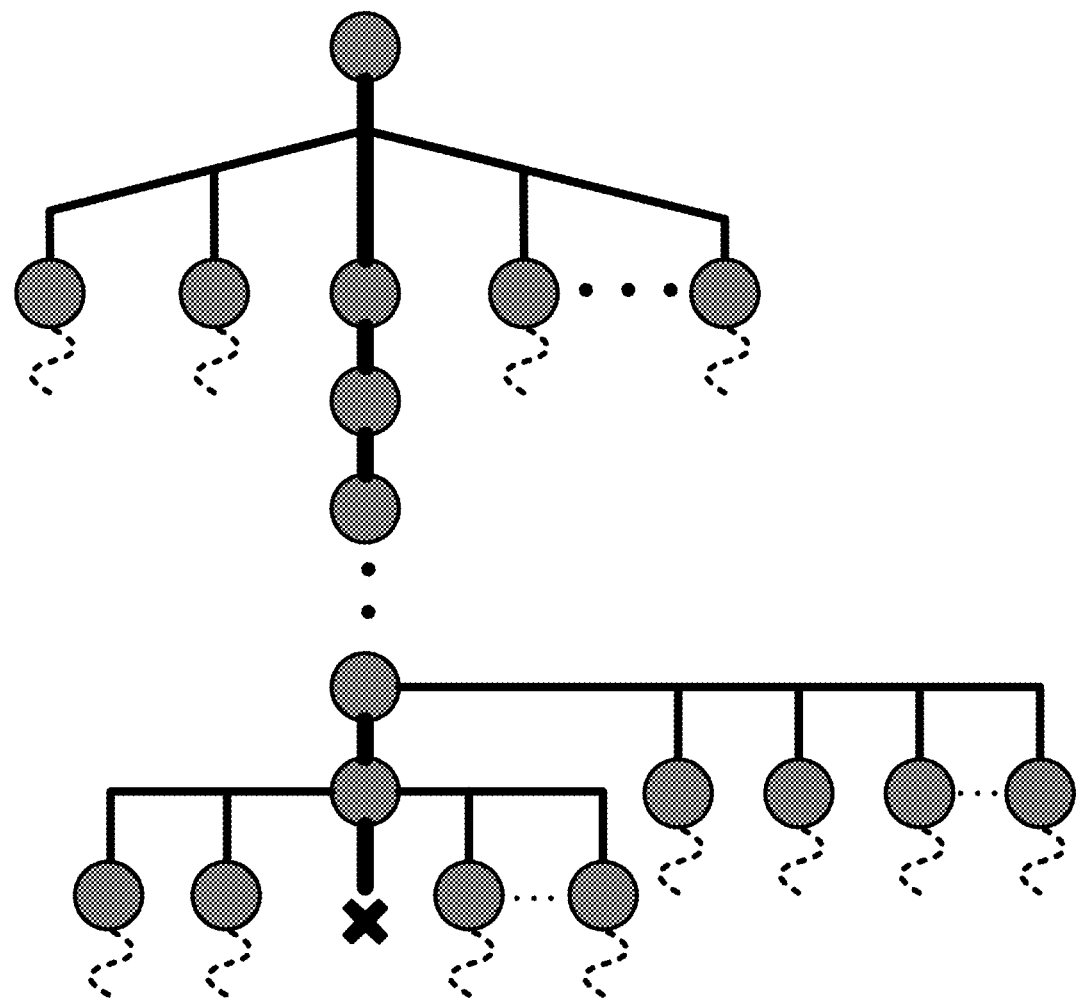
Figure 5E:
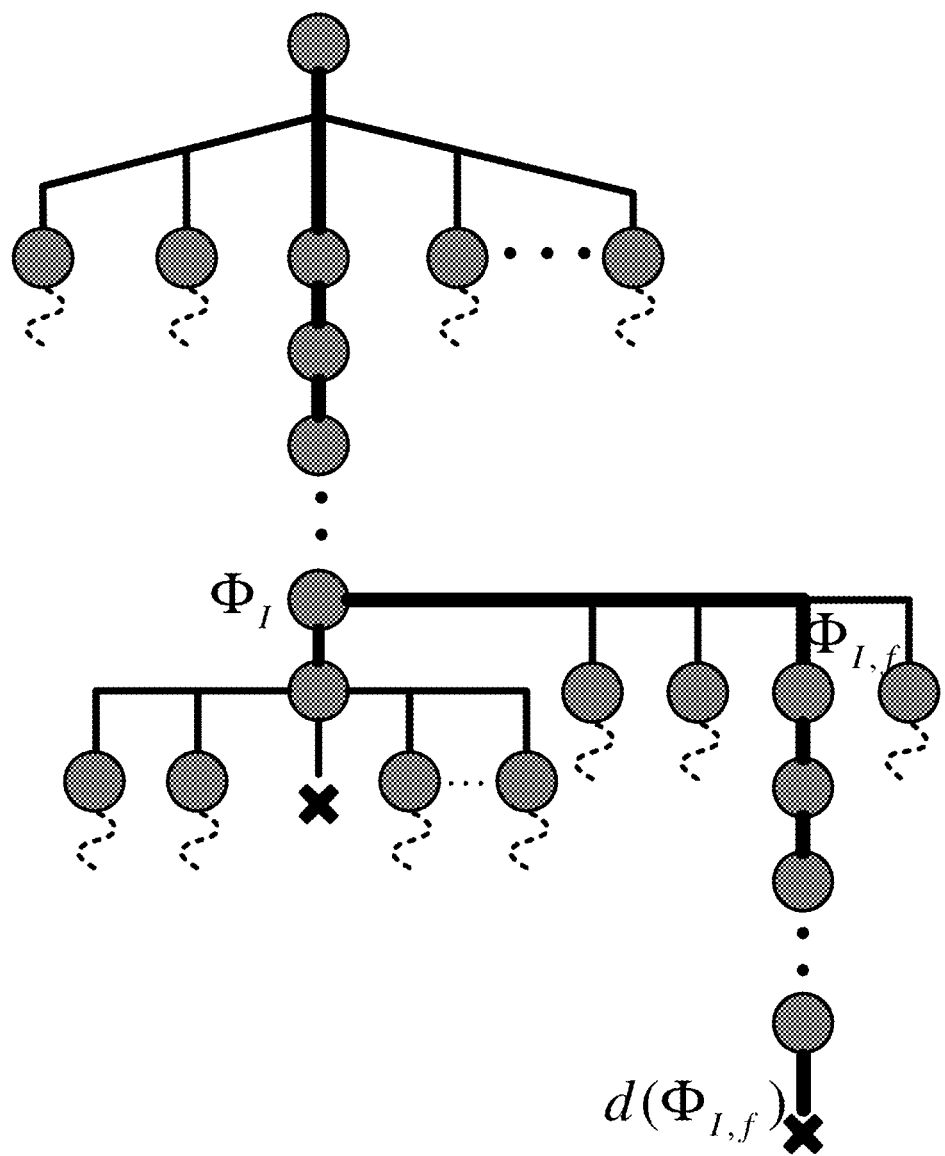

As shown in FIG. 4, a next alternative state set of a certain state is also a state space of the state, and for the state $\Phi_0$, a possible next state thereof, i.e., a state space determination process of the state $\Phi_0$ comprises: determining a support state of the center of gravity of the six-foot robot in the scaled support polygon in a pre-set support state table, and setting the obtained n support states as a set S. For any supporting state $s \in S$, the maximum advance step length $MS_{s,MD}$ of the six-foot robot in the corresponding advancing direction MD can be determined, the maximum advance step length $MS_{s,MD}$ is discretized into $MS_{s,MD}/3$, $MS_{s,MD} \times 2/3$, $MS_{s,MD}$ three different length steps, and all the steps are grouped into a set L. For any length of step $l \in L$, there is a $m_{l,s}$ combination of footing points of each swinging leg of six-foot robot in support state s. A set of next alternative states consisting of all next alternative states of any state of the six-foot robot is defined as $AS(\Phi_0)$, and the number of next alternative states of the state is $N_{alternative}(\Phi_0)$, which can be determined by a second formula as follows:

$$N_{alternative}(\Phi_0) = \sum_{s \in S}\sum_{l \in L} m_{l,s}.$$

The child nodes of the current node are randomly selected in the child node set of the current node, i.e. the next state is randomly selected in the state space of the current state.

In the preferred embodiment, the simulation speed can be improved by randomly selecting the next child node from the child node set of the current node.

Preferably, the state of the robot comprises a rotation matrix $_B^W R$, a body position $_B^W r$, a support state vector $c_F$, a leg state vector $t_F$ and a swinging leg foothold point vector $_F^W r$ of the robot, and the step 214 comprises:

step 2141, acquiring the current body position $_B^W r$, equipment information and ground foothold point information about the robot, establishing a body coordinate system of the robot, and determining a rotation matrix $_B^W R$ from the body coordinate system to a world coordinate system;

specifically, its body position in the world coordinate system can be determined by the positioning device $_B^W r$ of the six-foot robot.

Step 2142, determining a support state and a moving step length of the robot in the next motion cycle according to the equipment information, the support state comprising a support leg combination and a swinging leg combination, the swinging leg combination comprising zero or at least one swinging leg, and determining the support state vector $c_F$ of the robot according to the support leg combination and the swinging leg combination.

Specifically, the equipment information comprises fault information; the leg of the six-foot robot other than the fault leg is determined to be a pre-selected support leg according to the fault information; and the pre-selected support state of the six-foot robot is determined according to a pre-selected support leg corresponding relationship with a pre-set support state, wherein the pre-selected support state corresponding relationship comprises at least one pre-selected support state and a stability margin, a body maximum advance step length and a swinging leg pre-selected combination respectively corresponding to each pre-selected support state, and the support state corresponding relationship can be in a table form, i.e., a support state table shown in table 1. A third formula is used to determine the evaluation function of each pre-selected support state of the six-foot robot according to the stability margin and the maximum advance step length of the body. The third formula is:

$$f(\text{state}) = \omega_1 \cdot BM_{state} + \omega_2 \cdot MS_{state}^{MD}, \text{state} \in S,$$

wherein, f(state) is an evaluation function, S is a pre-selected support state set, the pre-selected support state set is a set composed of all the pre-selected support states, state is any pre-selected support state in the pre-selected support state set, $BM_{state}$ is a stability margin corresponding to the pre-selected support state, $MS_{state}^{MD}$ is the maximum advance step length of the machine body corresponding to the pre-selected support state, $\omega_1$ is a weight of the stability margin, and $\omega_2$ is a weight of the maximum advance step length of the machine body; in the process of movement, the greater the $\omega_1$, it is indicated that the six-foot robot is more stable, and the greater the $\omega_2$, it is indicated that the walking speed of the six-foot robot is faster; therefore, the values of $\omega_1$ and $\omega_2$ may be selected according to particular needs.

The stable support state is determined using a fourth formula according to the evaluation function as follows:

$$\text{state}_0 = \underset{state \in S}{\operatorname{argmax}}(f(\text{state})),$$

wherein $\text{state}_0$ is a stable support state. The maximum advance step length of the machine body corresponding to the stable support state is a moving step length of the six-foot robot, the pre-selected combination of swinging legs corresponding to the stable support state is the swinging leg combination, and the legs other than the swinging legs are support leg combinations.

The six-foot robot may also be unable to determine the swinging leg combination within a certain motion cycle, i.e., the number of swinging legs is zero and the number of support legs is six; at this moment, the six-foot robot is controlled to move to the next position according to the center of gravity trajectory of the machine body, and then the swinging leg combination of the six-foot robot is determined according to the state information at the next position; if the number of swinging legs in the swinging leg combination is still zero, the six-foot robot stops moving forward; and if at least one swinging leg is included in the swinging leg combination, the next state of the six-foot robot continues to be planned.

Step 2143, combining the moving step length and the equipment information, respectively determining a body center of gravity trajectory of the robot and a foothold region of each of the swinging legs.

Specifically, the equipment information includes device parameters and preset body motion parameters of each swinging leg of the six-foot robot. The next position of the center of gravity of the machine body can be obtained by moving step length forward on the machine body position, so that the center of gravity of the machine body of the six-foot robot is located at the next position of the center of gravity of the machine body, and a foothold region of each swinging leg is respectively determined according to equipment parameters of each swinging leg, wherein the equipment parameters comprise physical parameters such as a swinging angle and a length of the swinging leg. Based on the polynomial fitting method, the body center of gravity trajectory is determined according to the current position, the next position of the body center of gravity and the body motion parameters.

Step 2144, determining a target foothold point of each of the swinging legs in a corresponding the foothold point region according to the ground foothold point information, and determining the leg state vector $t_F$, the swinging leg foothold point vector $_F^W r$ and a foot end trajectory of each of the swinging legs according to the equipment information and the target foothold point of each of the swinging legs;

specifically, a set of foothold points in each foothold region is determined from the ground foothold point information, the set of foothold points comprises zero or at least one of the preselected foothold points.

For any swinging leg, the set of foothold points is made to be P, the cost function for determining the selected target foothold point according to the third formula is as follows:

$$f(p_e) = \overrightarrow{p_i p_e} \cdot \overrightarrow{MD}, p_e \in P,$$

wherein $p_i$ is the current position of the foot end of the swinging leg, $p_e$ is a pre-selected foot-falling point corresponding to the swinging leg, $\overrightarrow{MD}$ is a unit vector in the movement direction of the six-foot robot body, and $f(p_e)$ is the cost function.

Based on the cost function, a target foothold point of each swinging leg is determined according to the following formula:

$$p = \underset{p_e \in P}{\operatorname{argmax}}(f(p_e)),$$

Wherein p is a target foothold point of the swinging leg.

Whether the leg of the six-foot robot is a wrong leg is determined according to the fault information and the target foothold point, the wrong leg is a leg without the target foothold point and a failed leg, the value of the wrong leg is set to be 1, and the value of the normal leg is set to be 0, and a leg state vector $t_F$ is determined. For swinging legs with target foothold points outside the wrong leg, the target foothold points of each swinging leg constitute a swinging leg foothold point vector $_F^W r$.

Based on a polynomial fitting method, a foot end trajectory of the swinging leg is determined according to the current position of the foot end, the target foothold point and the swinging leg motion parameter.

Step 2145, determining a current state of the robot according to the rotation matrix $_B^W R$, the machine body position $_B^W r$, the support state vector $c_F$, the leg state vector $t_F$ and the swinging leg foothold point vector $_F^W r$; and controlling the robot to move to the next position according to the body center of gravity trajectory and the foot end trajectory, returning to step 2141, starting iteration from the extended node multiple times until the state of the robot obtained by iteration satisfies the first termination condition, and let the number of all states between the state obtained by iteration and the extended node as a simulation distance.

Specifically, the current state of the six-foot robot is determined according to each parameter, the robot is controlled to move to the next position, the above process is repeated, the next state of the six-foot robot is determined, and so on.

In the preferred embodiment, the next state of the six-foot robot is determined step by step in periods, and the simulation results show that the path can improve the stability of the six-foot robot during its motion process.

Preferably, the first termination condition includes at least one of a moving step length of the robot corresponding to a plurality of generated states in succession being 0, and the simulation distance is greater than a preset simulation view and the generated state reaching the target state.

In particular, in the first termination condition, the length of advance of the robot corresponding to the state obtained by successive $N_{stop}$ simulations or iterations is zero, i.e. the six-foot robot is continuously jammed during the simulation, and the $N_{stop}$ value is too small, which may result in some path that are only temporarily jammed but can pass for a long time. The simulation distance corresponding to the simulation obtained termination state is greater than a preset simulation view, i.e., the distance traveled by the six-foot robot in the simulation process exceeds the pre-set simulation view SH; the termination state reaches the target state, i.e., the six-foot robot reaches the position corresponding to the target state in the simulation process; the greater the value SH, the more the consideration, the greater the capacity of the six-foot robot corresponding to the obtained state sequence is, but the higher the search time is, therefore, a smaller value SH can be obtained as far as possible under the condition of ensuring the throughput.

Preferably, the step 215 comprises:

Comparing the simulation distance with the pre-set simulation view, and when the simulation distance is greater than or equal to the simulation view, tracing back and updating the total number of times the extended node is accessed to all nodes of the root node and the simulation success parameter.

tracing back and updating the total number of times the extended node is accessed to all nodes of the root node when the simulation distance is less than the simulation view.

Specifically, the father node is traced back from the extended node to the root node in turn, and the total number of times each node is accessed and the simulation success parameter is updated, Φ is made to be any node between the extended node and the root node, and when updating, the total number of times $N_{visit}(\Phi)+1$ it is accessed and the simulation success parameter $N_{success}(\Phi)+\Delta_{score}$ thereof, wherein:

$$\Delta_{score} = \begin{cases} 1, \text{ pass} \\ 0, \text{ notpass} \end{cases},$$

the simulation view SH is less than the distance from the extended node to the node corresponding to the target state, pass represents that the simulation distance is greater than or equal to the simulation view SH; notpass represents that the simulated distance is less than the simulated field of view SH.

Preferably, as shown in FIGS. 5A-5E, taking the node corresponding to the initial state as a starting node, extending the Monte Carlo tree using a Monte Carlo tree search algorithm until the generated target node reaches the target state comprises:

step 221, taking the starting node as a root node, determining a child node set of the root node, wherein the child node set comprises all child nodes of the root node.

Specifically, as shown in FIG. 5 (a), taking the starting node $\Phi_k$ as a root node, expanding all the child nodes of the root node $\Phi_k$, and extending all the child nodes of the root node $\Phi_k$ using the method of selecting an extended node in the above-mentioned step 213, and the child node set AS($\Phi_k$) of the root node is $\Phi_k$.

Step 222, for all the child nodes in the child node set, respectively starting to loop state simulation from each of the child nodes until the simulation state obtained by simulation satisfies a pre-set second termination condition, and let the node with the maximum simulation distance among all the nodes corresponding to the simulation state as the current termination node.

Specifically, for any child node $\Phi_1 \in AS(\Phi_k)$, the specific simulation method of step 214 can be used to perform simulation, the simulation distance for simulation with a node $\Phi_1$ as the starting point is set to be d($\Phi_1$), and the simulation distance is the number of nodes from the simulation starting point to the termination node, and the set of all nodes obtained from simulation with the node $\Phi_1$ as the starting point is set to be T($\Phi_1$). In the embodiment, the second termination condition comprises that the moving step length of the six-foot robot corresponding to the continuous plurality of nodes obtained by simulation is 0, i.e., the six-foot robot is stuck, and/or the nodes obtained by simulation reach the target state. As shown in FIG. 5 (*b*), X is the termination node.

Step 223, tracing back to a father node in sequence starting from the current termination node until the starting node is reached, and determining that a sequence composed of all the nodes from the starting node to the current termination node is a current main branch;

specifically, the node with the largest simulation distance is selected as the current termination node, all the nodes from the current termination node to the starting node are traversed, and all the nodes are arranged in the order from the starting node to the termination node to form a sequence, which is the current main branch. In the embodiment, all nodes between the current termination node to the starting node in the current main branch are extended into the Monte Carlo tree. As shown in FIG. 5 (*b*), the sequence of all nodes from the starting node to the current termination node is the current main branch.

Step 224, determining whether the simulation state corresponding to the current termination node reaches the target state, and if so, proceed to step 226; if not, proceed to step 225.

In step 225, selecting a node as the root node in the current main branch, and returning to step 221.

Specifically, as shown in FIG. 5 (*c*), if the current termination node obtained by simulation does not reach the target state, the next node $\Phi_n$ adjacent to the current termination node in the direction towards the starting node is selected as a root node on the current main branch, returning to step 221, all the child nodes of the root node are extended, d($\Phi_{ni}$) is a simulation distance corresponding to performing simulation on a child node ni of the root node, a new termination node with the maximum simulation distance is determined, and the new termination node to all the nodes of the starting node is transversed again, and the main branch is updated. When a node $\Phi_n$ is selected as a root node, a part of the main branch from the node $\Phi_n$ to the starting node can be reserved, and when a node is traversed upwards from a new termination node, only the root node can be traversed, and all the nodes obtained by extending and simulating the node $\Phi_n$ as a starting point are combined with the part of the main branch to generate a new main branch.

Step 226, let the termination node be the target node, and traversing the target node to all nodes of the starting node.

In this alternative embodiment, after determining the child nodes of the root node, the simulation is performed directly according to each child node. Compared with recursively selecting the child nodes in the Monte Carlo tree until the leaf node is reached, the process of searching for the nodes in the Monte Carlo tree is omitted, the state obtained by simulation is added to the main branch of the Monte Carlo tree, and the main branch is updated iteratively, so that the target state is approached continuously, and the simulation result is fully used, which can quickly generate the state sequence through the current terrain, greatly improve the speed of generating the state sequence and improve the efficiency. In addition, the simulation is performed to find a position which easily causes the six-foot robot to be trapped, and a new root node is selected in the main branch to perform the simulation again until the simulation state passes the position which easily causes the trapping, so that the finally generated state sequence can improve the capacity of the six-foot robot in the current terrain.

Preferably, the length of the starting node to the ending node is made to be a first length, and the length of the current main branch is made to be a second length, and the step 225 comprises:

step 2251, sequentially selecting a current node in the main branch as the root node in the order from the current termination node to the starting node;

step 2252, for each determined root node, performing steps 221 and 222 in turn to obtain a new termination node; and step 2253, determining whether the first length corresponding to the new termination node is greater than the second length, and if so, updating the current termination node as the new termination node, and proceeding to step 223; if not, returning to step 2251.

Specifically, according to the order from the termination node to the starting node, the nodes in the current main branch are sequentially selected as the root nodes, and for each selected root node, steps 221 and 222 are sequentially executed to extend all the child nodes of the root node, and then simulation is performed according to each child node to determine that the node with the maximum simulation distance is a new termination node, and determine whether the first length corresponding to the new termination node is greater than the second length of the current main branch. If the first length is less than or equal to the second length, in the current main branch, a next node adjacent to the current root node in the direction of the starting node is selected as a root node, and the above-mentioned steps are repeated until the first length corresponding to the obtained new termination node is greater than the second length of the current main branch, then a sequence composed of all the nodes from the starting node to the new termination node are taken as a new main branch. As shown in FIGS. 5 (*d*) and 5 (*e*), the node $\Phi_n$ is a root node, and the first length corresponding to the simulated termination node is not greater than the second length of the current main branch; therefore, in the direction pointing to the starting node $\Phi_k$, the next node $\Phi_I$ adjacent to the node $\Phi_n$ is selected as the root node, and steps 221 and 222 are performed in succession to determine a new termination node $\Phi_{I,f}$ with the maximum simulation distance, and at this time, the first length corresponding to the new termination node $\Phi_{I,f}$ to is greater than the second length of the current main branch, and therefore all nodes from the new termination node $\Phi_{I,f}$ to the starting node are traversed to update the main branch.

The first length is the number of all nodes comprised by the termination node to the starting node and the second length is the number of all nodes comprised by the current main branch.

It should be noted that when the current termination node does not reach the target state, it means that the simulation cannot be continued on the basis of the current termination node, and therefore when selecting a new root node, the new root node is sequentially selected starting from the next node adjacent to the current termination node in the current main branch according to the direction from the current termination node to the starting node.

In the preferred embodiment, when the current termination node does not reach the target state and the simulation cannot continue, it is indicated that the position corresponding to the current termination node is easy to confine the six-foot robot, and the simulation method is performed again by rolling back to reselect the root node in the main branch, so that the finally generated state sequence can improve the passing capability of the six-foot robot in complex terrain. Only when the length from the new termination node to the starting node obtained by simulation is greater than the length of the current main branch, updating the current main branch can ensure that each updated main branch and termination node are closer to the target state, which improves the speed and efficiency of generating the state sequence.

Figure 6:
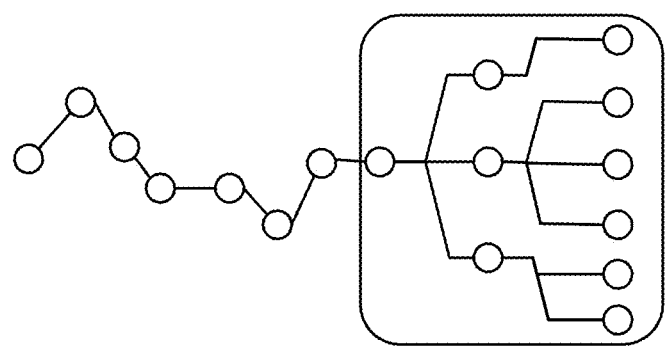
FIG. 6 is a schematic diagram of extending a Monte Carlo tree to a nominal depth according to another embodiment of the present disclosure.
Figure 7:
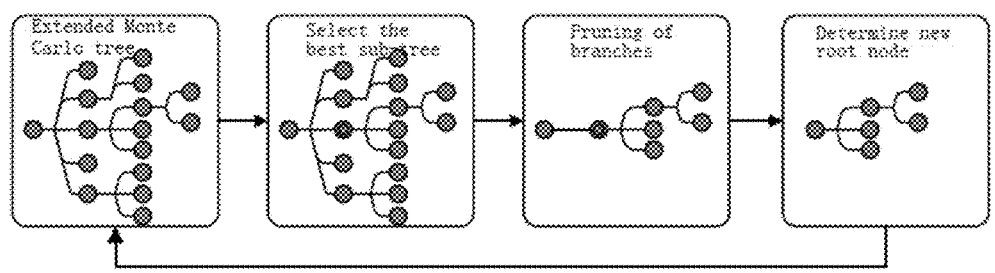
FIG. 7 is a flow diagram of an extended Monte Carlo tree according to another embodiment of the present disclosure.

Preferably, as shown in FIGS. 6 and 7, taking the initial state as a root node, extending the Monte Carlo tree using a Monte Carlo tree search algorithm until the generated target node reaches the target state comprises:

step 231, taking the starting node as a root node, extending the nodes of the Monte Carlo tree to a nominal depth using a Monte Carlo tree search algorithm, and determining the scores of all the nodes in the Monte Carlo tree according to a pre-set scoring rule;

specifically, as shown in FIG. 6, extending the nodes of the Monte Carlo tree to a nominal depth may be viewed as constructing the Monte Carlo tree in a window of nominal window width. The method of extending the Monte Carlo tree in the above can be used to extend the Monte Carlo tree to a nominal depth; firstly, according to a root node, child nodes are recursively selected for multiple times in the constructed Monte Carlo tree, and then state simulation is performed on each leaf node of the current extended Monte Carlo tree for multiple times until obtaining a simulation end node, and the length from the simulation end node to the root node is determined, wherein the length is the number of all nodes traversed from the simulation end node back to the root node, and the length is equal to the nominal depth. It is also possible to create an extended node for each leaf node after the leaf nodes and start the simulation from the leaf nodes as described in step 213.

Step 232, determining an optimal child node of the root node according to the score of each node, let the optimal child node be the root node, returning to step 231, and iterating for a plurality of times until the state corresponding to the target node obtained by extension reaches the target state.

Specifically, as shown in FIG. 7, an optimal child node of a root node is selected according to the score of each node, the optimal child node and a sub-tree thereof are kept, other branches outside the optimal child node and the sub-tree thereof are clipped, and the optimal child node is taken as a root node, and the above-mentioned steps are repeated until the node of the generated Monte Carlo tree reaches a target state.

In this alternative embodiment, the Monte Carlo tree of the nominal depth is only extended to determine the child node of the current root node each time, then it is continuously extended, compared with extending the Monte Carlo tree until it cannot be extended, the sequence is determined directly in the whole Monte Carlo tree, which can reduce the time for searching nodes and greatly improve the generation speed of the state sequence. The child nodes of the current root node are determined in the Monte Carlo tree of each generated nominal depth, and then the Monte Carlo tree is re-extended; compared with the simulation randomly generated state, the state sequence is directly determined according to all the states obtained by the simulation; while the Monte Carlo tree is extended, the child nodes are selected, and the sequence from the initial state to the current state is determined in real time, so that the Monte Carlo tree is optimized, which can simplify the complex state information and reduce the number of states in the finally generated state sequence, so that the finally generated state sequence can increase transit speed on ensuring the passing capability of the six-foot robot.

Preferably, the extending the nodes of the Monte Carlo tree to a nominal depth using a Monte Carlo tree search algorithm comprises:

recursively selecting child nodes downwards from the root node until a cutoff node, wherein the depth from the cutoff node to the root node is a third length, and then circularly performing state simulation starting from the cutoff node until the simulation distance reaches a fourth length, wherein the sum of the third length and fourth length is the nominal depth.

Figure 8:
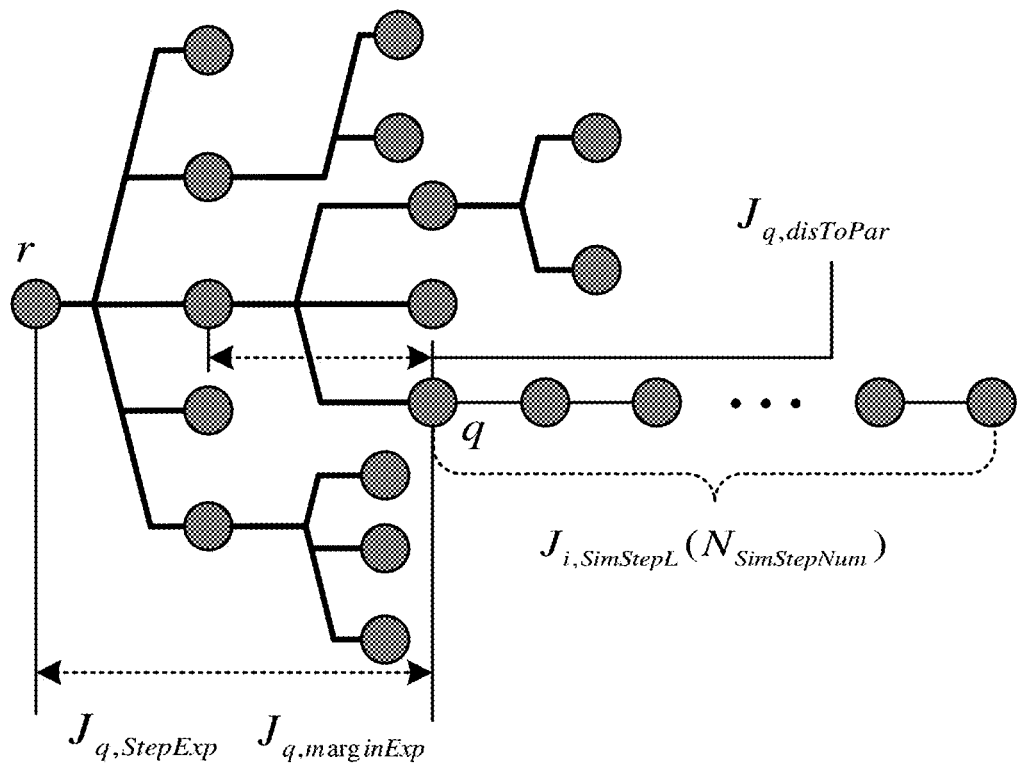
FIG. 8 is a diagram showing a score indicator according to another embodiment of the present disclosure.

Specifically, as shown in FIG. 8, the simulation distance for each simulation, i.e. the fourth length, may be made consistent, with the fourth length being $N_{SimStepNum}$, which is used to facilitate subsequent determination of the score for each node. In the embodiment, the simulation result node does not actually extend into the Monte Carlo tree, and is a virtual simulation.

Preferably, each node respectively corresponds to a moving step length and a static stability margin of the robot in a corresponding state, and the determining the scores of all the nodes in the Monte Carlo tree according to a preset scoring rule comprises:

determining a first average moving step length of all nodes obtained by state simulation, a second average moving step length and an average static stability margin of all nodes between the cutoff node and the root node, and a current moving step length of the cutoff node to a father node of the cutoff node according to the moving step length and the static stability margin of each node in the Monte Carlo tree.

Specifically, as shown in FIG. 8, let the cutoff node be q, such that the first average moving step length of all nodes obtained from the cutoff node q simulating a fixed distance $N_{SimStepNum}$ is $J_{q,SimStepL}$. The longer the simulation distance, the longer the first average step length, the larger $J_{q,SimStepL}$, which indicates that the six-foot robot has better passing capability at the cutoff node q.

Let $J_{q,StepExp}$ be the second average moving step length of all nodes from the cutoff node q to the root node, the larger this value, enabling the algorithm to tend to converge to a faster moving sequence. The set of all nodes from the cutoff node q to the root node is $C_q$, the number of elements included in the set $C_q$ is defined to be $n_t$, the step length of any node t in the set $C_q$ with its father node is defined to be $s_t$, for the root node r, $s_r$ is 0. $J_{q,StepExp}$ can be determined by the following formula:

$$J_{q,StepExp} = \frac{1}{n_t} \sum_{t \in C_q} s_t.$$

Let $J_{q,marginExp}$ be an average static stability margin of all nodes from the cutoff node q to the root node, the larger the value, the better the algorithm will tend to converge to a more motion-stable sequence. $SM_t$ is a static stability margin of any node t in the set $C_q$, and $J_{q,marginExp}$ is determined by the following formula:

$$J_{q,marginExp} = \frac{1}{n_t} \sum_{t \in C_q} SM_t.$$

Let $J_{q,disToPar}$ be a current move step from the parent of the cutoff node q to the cutoff node q, by which the algorithm can be prevented from repeatedly accessing nodes with very small forward distances.

Weighted summation is carried out on the first average moving step length, the second average moving step length, the average static stability margin and the current moving step length to determine a reward value of the cutoff node.

Specifically, $J_{q,SimStepL}$, $J_{q,StepExp}$, $J_{q,marginExp}$ and $J_{q,disToPar}$ are subjected to the weighted summation to obtain a reward value for the cutoff node q as shown in the following equation:

$$J_q = \omega_{q,SimStepL} \cdot J_{q,SimStepL} + \omega_{q,StepExp} \cdot J_{q,StepExp} + \omega_{q,marginExp} \cdot J_{q,marginExp} + \omega_{q,disToPar} \cdot J_{q,disToPar},$$

wherein $J_q$ is a reward value of a cutoff node q, $\omega_{q,SimStepL}$ is a weight parameter of a first average moving step length, $\omega_{q,StepExp}$ is a weight parameter of a second average moving step length, $\omega_{q,marginExp}$ is a weight parameter of an average static stability margin, and $\omega_{q,disToPar}$ is a weight parameter of a current moving step length.

Tracing back and updating reward values of all nodes of the cutoff node to the root node back according to the reward values of the cutoff node, and determining a score of each node according to the reward values of each node.

Specifically, all the ancestors of the cutoff node q are traced back and updated from the cutoff node q to the root node in sequence, so that the set of all the ancestors of the cutoff node q is $S_i$, for any node $s \in S_i$, the reward value thereof is $X_j$, and the reward value update formula of the node j can be represented by the following formula:

$$X_j = \begin{cases} J_q(J_q > X_j) \\ X_j(\text{else}) \end{cases}, j \in S_i,$$

Comparing the reward value $J_q$ of the cutoff node q with the reward value $X_j$ of the node j, when $J_q > X_j$, the reward value of the node j is updated as $J_q$; when $J_q \leq X_j$, the reward value of the node j remains unchanged. For the state sequence planning of six-foot robot, only one sequence with better state index needs to be found, so it is better to measure the quality of a sub-tree and characterize by the optimal child node of the sub-tree. If the average of the whole tree is measured, the nodes with lower values will reduce the value of the optimal child nodes, which will make it difficult to find the sequence to reach the target state in the sparse foothold point terrain.

When traced back and updated, the total number of accesses of all nodes from the cutoff node q to the root node is also incremented by one. The score of each node can be determined according to the upper bound confidence bound algorithm described above, and the score of each child node of the root node can be determined according to the following formula:

$$UCB = \frac{X(\Phi'_j)}{N_{visit}(\Phi'_j)} + C \cdot \sqrt{\frac{2 \ln N_{visit}(\Phi_j)}{N_{visit}(\Phi'_j)}},$$

Wherein, UCB is the score of a child node $\Phi'_j$, and $N_{visit}(\Phi_j)$ is still the total number of times any node $\Phi_j$ in the Monte Carlo tree is visited, and $N_{visit}(\Phi'_j)$ is still the total number of times a child node $\Phi'_j$ of a node $\Phi_j$ is visited, and the simulation success parameter is replaced with the reward value $X(\Phi'_j)$ of the child node $\Phi'_j$, C is a balance coefficient, and can be taken as 0 in the embodiment.

Figure 9:
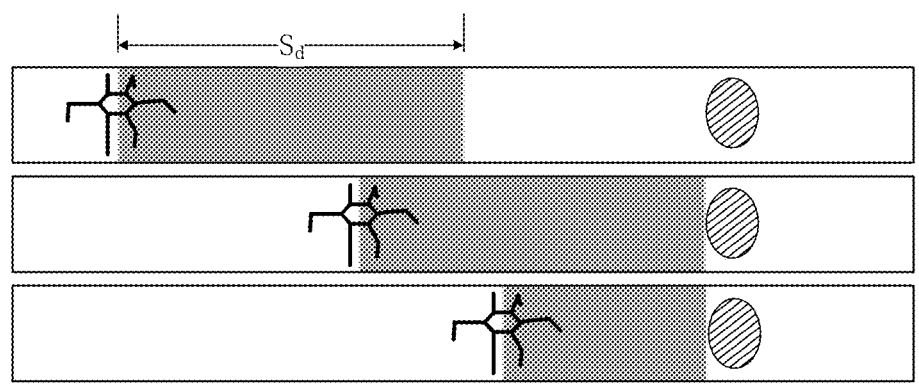
FIG. 9 is a schematic diagram of a local target distance according to another embodiment of the present disclosure.

As shown in FIG. 9, $S_d$ is the nominal depth, the round stops extending the Monte Carlo tree when the sum of the distance from a node in the Monte Carlo tree to the root node and the simulated distance from the node exceeds the nominal depth. When there is an obstacle, the distance to the target position shrinks, and as shown in FIG. 9, the ellipse figure corresponds to the obstacle, and the corresponding nominal depth shrinks; when the nominal depth reduces to a very small preset threshold value, the whole algorithm stops, and no action is taken.

Figure 10:
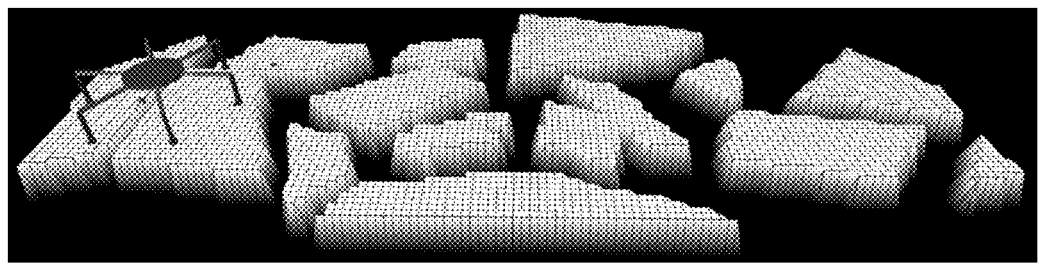
FIG. 10 is a topographical view of a discrete foothold point according to an embodiment of the present disclosure.
Figure 13:
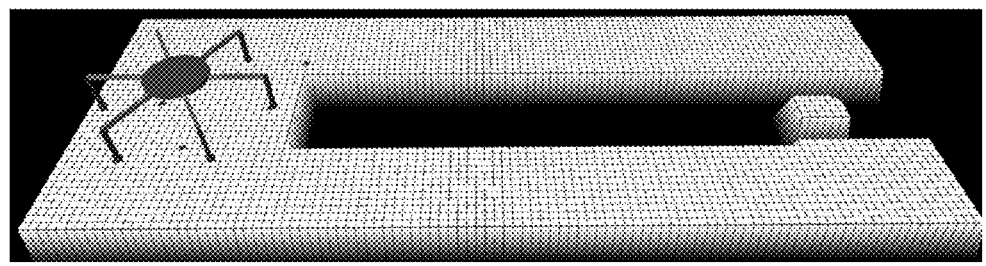
FIG. 13 is a schematic representation of an intermediate foothold-free point terrain according to an embodiment of the present disclosure.
Figure 15:
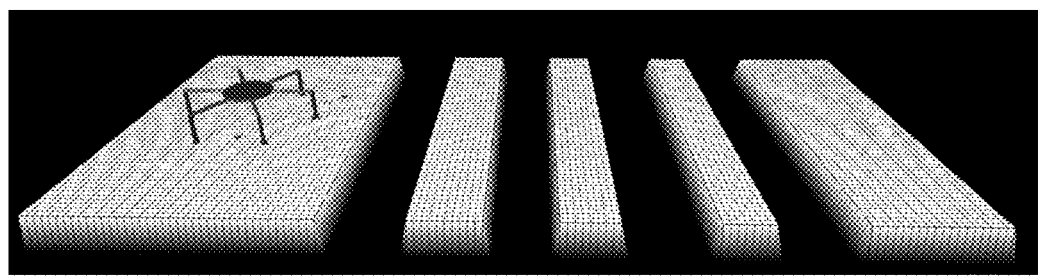
FIG. 15 is a schematic representation of the topography of a continuous moat according to an embodiment of the present disclosure.

A robot state planning method based on a Monte Carlo tree search algorithm according to an embodiment of the present disclosure is further described by taking a six-foot robot as an example respectively through a scattered foothold point terrain as shown in FIG. 10, a middle foothold-free point terrain as shown in FIG. 13 and a continuous moat terrain as shown in FIG. 15. It should be noted that in the following example, the method of extending only the Monte Carlo tree to the nominal depth at a time is used.

Figure 11:
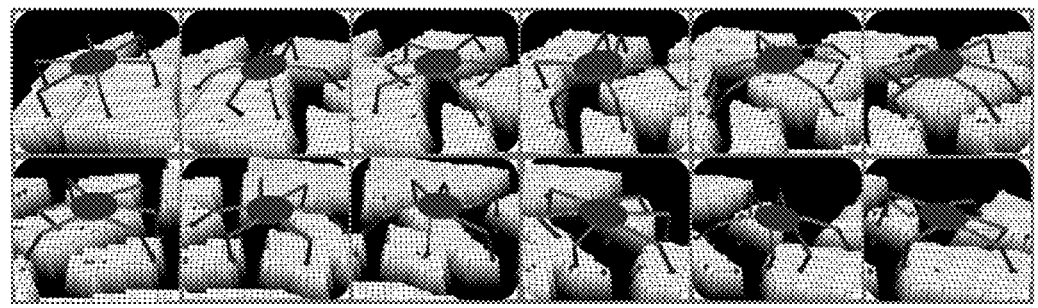
FIG. 11 is a schematic diagram of a simulation of a six-foot robot passing through the terrain shown in FIG. 10 according to an embodiment of the present disclosure.

In FIG. 10, the white region is a foothold point region, the black region is a foothold-free point region, and in FIG. 11, from left to right, from top to bottom are 12 movement states in succession when the six-foot robot passes through the scattered foothold terrain shown in FIG. 10. It can be seen from the simulation results in FIG. 11 that using the robot state planning method based on a Monte Carlo tree search algorithm of the present application, the six-foot robot can smoothly pass through the terrain away from the scattered foothold points.

Figure 12:
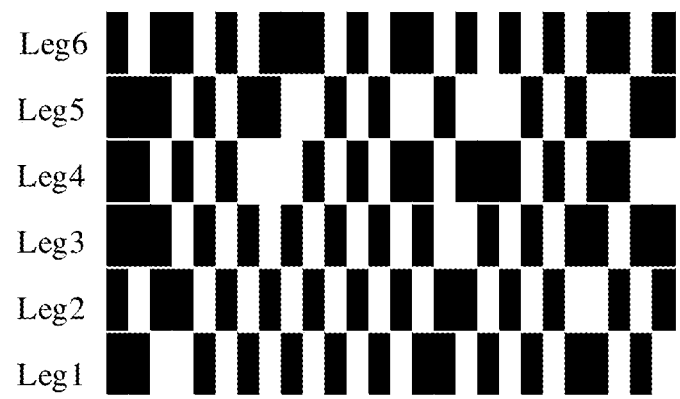
FIG. 12 is a phase diagram illustrating a foot support state of a six-foot robot according to an embodiment of the present disclosure.

The phase sequence diagram of the leg support state of the six-foot robot shown in FIG. 12 can determine the gait of the six-foot robot during the whole motion process by extracting the support state vector in each motion state in the state sequence to obtain the phase relationship between the legs of the six-foot robot in the whole motion process as shown in FIG. 12, and the six legs of the six-foot robot are named as Leg1, Leg2, Leg3, Leg4, Leg5 and Leg6 in succession; in FIG. 13, the black part indicates that the corresponding leg is used as a support leg and represents a support phase, and the white part indicates that the corresponding leg is used as a swinging leg and represents a swing phase. In the first motion period of the six-foot robot, Leg1, Leg2, Leg3, Leg4, Leg5 and Leg6 are all used as support Legs, indicating that the first motion period of the six-foot robot does not move; in the second movement cycle, Leg1, Leg3, Leg4 and Leg5 are used as support Legs, Leg2 and Leg6 as swinging Legs, and so on. It can be seen that when the robot state planning method based on a Monte Carlo tree search algorithm of the embodiment of the present disclosure is used to plan the robot state, the support state in each movement state is freely selected, and the six-foot robot is free to switch between the three-foot gait, the four-foot gait and the five-foot gait, so that an appropriate gait mode can be selected according to different topographies, thereby improving the passing capability of the six-foot robot in various complex terrain.

Figure 14:
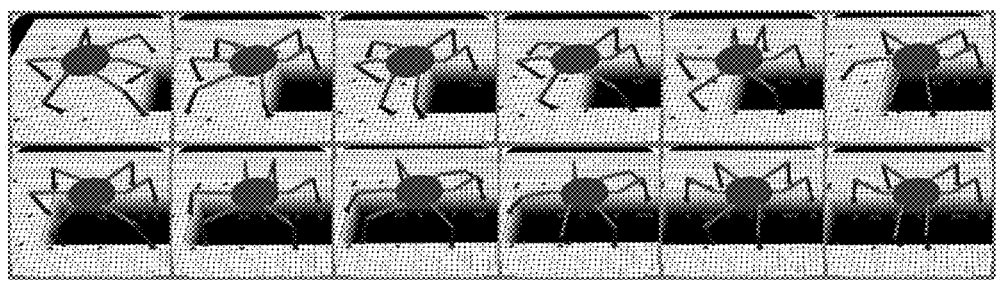
FIG. 14 is a schematic diagram of a simulation of a six-foot robot passing through the terrain shown in FIG. 13 according to an embodiment of the present disclosure.

In FIG. 13, the white region is the foothold point region, the black region is the foothold-free point region, and the middle of the ground is continuous foothold-free point. From left to right and from top to bottom in FIG. 14 are 12 movement states of the six-foot robot when passing through the foothold-free point terrain in the middle as shown in FIG. 13. It can be seen from the simulation results in FIG. 14 that by using the robot state planning method based on a Monte Carlo tree search algorithm of the present application, the six-foot robot uses only four legs and two foothold-free point legs during the motion process, hovers at a predetermined position all the time, and smoothly passes through the terrain without foothold in the middle.

Figure 16:
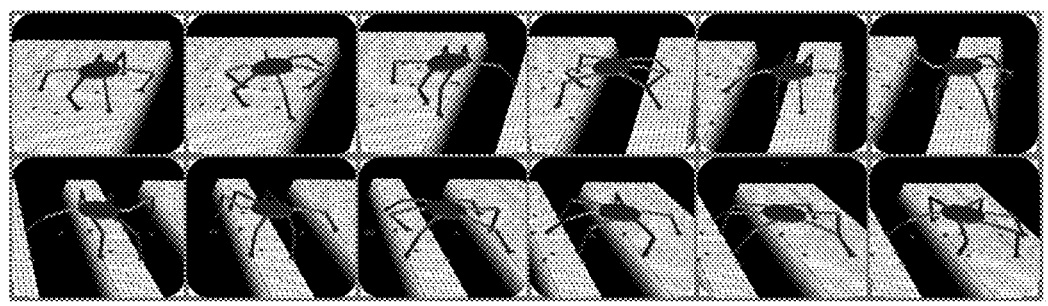
FIG. 16 is a schematic diagram of a simulation of a six-foot robot passing through the terrain shown in FIG. 15 according to an embodiment of the present disclosure.

In FIG. 15, where the white region is the foothold point region and the black region is the foothold-free point region, the terrain has a plurality of successive moats and the moats vary in width. From left to right and from top to bottom in FIG. 16 are twelve movement states of the six-foot robot in succession as it passes through the continuous moat terrain shown in FIG. 15. It can be seen from the simulation results in FIG. 16 that using the robot state planning method based on a Monte Carlo tree search algorithm of the present application, the six-foot robot continuously switches the step length and gait, and successfully passes through the terrain of the continuous moat.

By swinging the on.

Figure 17:
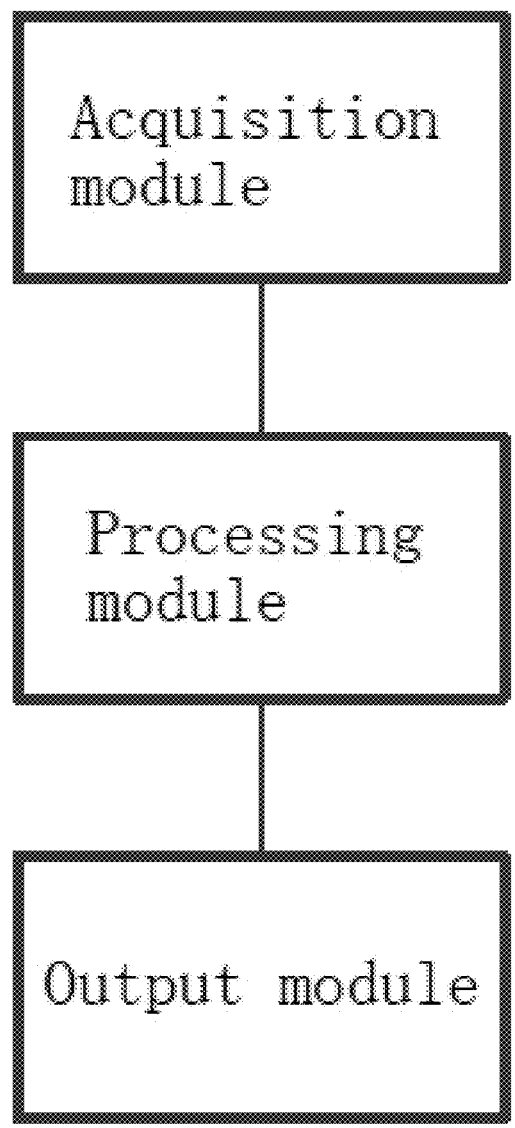
FIG. 17 is a schematic diagram of a robot state planning apparatus based on a Monte Carlo tree search algorithm according to an embodiment of the present disclosure.

As shown in FIG. 17, an embodiment of the present disclosure provides a robot state planning apparatus based on a Monte Carlo tree search algorithm, which comprises:

an acquisition module for acquiring an initial state and a target state of the robot;

a processing module for taking the initial state as a starting node, and extending the Monte Carlo tree using a Monte Carlo tree search algorithm until the generated target node reaches the target state; and an output module for determining a state sequence of the robot according to all nodes from the starting node to the target node.

Another embodiment of the present disclosure provides a six-foot robot comprising a memory and a processor; the processor is used for executing a computer program stored in the memory to perform the following operations:

acquiring an initial state and a target state of a robot;

taking the initial state as a root node, extending the Monte Carlo tree using a Monte Carlo tree search algorithm until the generated target node reaches the target state; and determining a state sequence for the robot from all nodes from the root node to the target node.

Preferably, when the processor executes a computer program stored in the memory, operations corresponding to the steps of the method in the embodiments described above are also performed.

A further embodiment of the present disclosure provides a non-transitory computer-readable storage medium having stored thereon a computer program, which when executed by a processor, performs the following operations:

acquiring an initial state and a target state of a robot;

taking the initial state as a root node, extending the Monte Carlo tree using a Monte Carlo tree search algorithm until the generated target node reaches the target state; and determining a state sequence for the robot from all nodes from the root node to the target node.

Preferably, the computer program, when executed by a processor, also performs operations corresponding to the steps of the method in the embodiments described above.

It will be appreciated by a person skilled in the art that implementing all or part of the flow of the methods of the embodiments described above can be accomplished by a computer program instructing the associated hardware, which program can be stored on a non-transitory computer-readable storage medium, and which when executed can include the flow of the embodiments of the methods described above. The storage medium may be a magnetic disk, an optical disk, a Read-Only Memory (ROM) or a Random Access Memory (RAM), etc. In the present application, the elements described as separate elements may or may not be physically separated, the elements shown as elements may or may not be physical elements, i.e. may be located in one place, or may also be distributed over a plurality of network elements.

Although the present disclosure has been described above, the scope of the present disclosure is not limited thereto. It will be apparent to those skilled in the art that various modifications and variations can be made in the present disclosure without departing from the spirit or scope of the disclosure.

The invention claimed is:

1. A robot state planning method based on a Monte Carlo tree search algorithm, comprising:

acquiring an initial state and a target state of a robot;

taking the initial state as a starting node, extending a Monte Carlo tree using the Monte Carlo tree search algorithm until a generated target node reaches the target state; and determining a state sequence of the robot from all nodes from the starting node to the target node, wherein the extending the Monte Carlo tree using the Monte Carlo tree search algorithm until the generated target node reaches the target state comprises:

step 211, taking the starting node as a root node, recursively selecting a child node starting from the root node in the established current Monte Carlo tree until a leaf node is reached, wherein in the established current Monte Carlo tree, a child node of the root node is selected first, and then a child node of the child node is selected, and in succession circulated until the leaf node of the Monte Carlo tree is reached, and wherein each node respectively corresponds to a child node set, and the child node set comprises a plurality of child nodes;

step 212, determining whether a state corresponding to the leaf node is the target state, and if so, proceeding to step 216; if not, proceed to step 213;

step 213, randomly creating an extended node after the leaf node;

step 214, starting to loop state simulation from the extended node until the simulated state satisfies a pre-set first termination condition;

step 215, tracing back and updating the extended node to all nodes of the root node according to a simulation result, and returning to step 211; and step 216, let the leaf node be the target node, traversing the target node to all nodes of the starting node;

wherein each node has two parameters corresponding to total number of visits and a simulation success parameter, and the step 211 comprises:

for any node in the Monte Carlo tree, a score of each child node of the node is respectively determined according to an upper bound confidence bound algorithm, wherein the upper bound confidence bound algorithm is represented by a first formula, and the first formula is:

$$UCB = \frac{N_{success}(\Phi'_j)}{N_{visit}(\Phi'_j)} + C \cdot \sqrt{\frac{2\ln N_{visit}(\Phi_j)}{N_{visit}(\Phi'_j)}},$$

wherein $\Phi_j$ is any node in the Monte Carlo tree, $\Phi'_j$ is a child node of the node $\Phi_j$, UCB is the score of the child node $\Phi'_j$, $N_{visit}(\Phi_j)$ is the total number of times the node $\Phi_j$ is visited, $N_{visit}(\Phi'_j)$ is the total number of times the child node $\Phi'_j$ is visited, $N_{success}(\Phi'_j)$ is the simulation success parameter of the child node $\Phi'_j$, and C is a balance coefficient; and cyclically selecting the child node with the largest score starting from the root node until the leaf node is reached;

wherein a state of the robot comprises a rotation matrix, a body position, a support state vector, a leg state vector and a swinging leg foothold point vector of the robot, and the step 214 comprises:

step 2141, acquiring a current body position, equipment information and ground foothold point information about the robot, establishing a body coordinate system of the robot, and determining the rotation matrix from the body coordinate system to a world coordinate system;

step 2142, determining a support state and a moving step length of the robot in a next motion cycle according to the equipment information, the support state comprising a support leg combination and a swinging leg combination, the swinging leg combination comprising zero or at least one swinging leg, and determining the support state vector of the robot according to the support leg combination and the swinging leg combination;

step 2143, combining the moving step length and the equipment information, respectively determining a body center of gravity trajectory of the robot and a foothold region of each of swinging legs;

step 2144, determining a target foothold point of each of the swinging legs in a corresponding foothold point region according to the ground foothold point information, and determining the leg state vector, the swinging leg foothold point vector and a foot end trajectory of each of the swinging legs according to the equipment information and the target foothold point of each of the swinging legs; and step 2145, determining a current state of the robot according to the rotation matrix, a machine body position, the support state vector, the leg state vector and the swinging leg foothold point vector; and controlling the robot to move to a next position according to the body center of gravity trajectory and the foot end trajectory, returning to step 2141, starting iteration from the extended node for multiple times until the current state of the robot obtained by iteration satisfies a first termination condition, and let a number of all states between the state obtained by iteration and the extended node as a simulation distance.

2. The robot state planning method based on the Monte Carlo tree search algorithm according to claim 1, wherein each node respectively corresponds to a child node set, and the child node set comprises a plurality of child nodes, and the step 214 comprises:

iterating a random simulation algorithm cyclically according to the extended node until a simulation state obtained by simulation satisfies the first termination condition, wherein the random simulation algorithm comprises randomly determining a child node of a current node in the child node set of the current node;

wherein each of the simulation states respectively corresponds to a simulation distance and a moving step length of the robot, and the simulation distance is the number of all states between the simulation state and the extended node.

3. The robot state planning method based on the Monte Carlo tree search algorithm according to claim 2, wherein the first termination condition comprises at least one of the following: the moving step length corresponding to a plurality of generated states in succession is 0, the simulation distance is greater than a preset simulation view, and the generated states reach the target state.

4. The robot state planning method based on the Monte Carlo tree search algorithm according to claim 3, wherein the step 215 comprises:

comparing the simulation distance with the pre-set simulation view, and when the simulation distance is greater than or equal to the simulation view, tracing back and updating the total number of times the extended node is accessed to all nodes of the root node and the simulation success parameter;

tracing back and updating the total number of times the extended node is accessed to all nodes of the root node when the simulation distance is less than the simulation view.

5. A robot state planning method based on a Monte Carlo tree search algorithm, comprising:

acquiring an initial state and a target state of a robot;

taking the initial state as a starting node, extending the Monte Carlo tree using a Monte Carlo tree search algorithm until a generated target node reaches the target state; and determining a state sequence of the robot from all nodes of the starting node to the target node, wherein the extending the Monte Carlo tree using the Monte Carlo tree search algorithm until the generated target node reaches the target state comprises:

step 221, taking the starting node as a root node, determining a child node set of the root node, wherein the child node set comprises all child nodes of the root node;

step 222, for all the child nodes in the child node set, respectively starting to loop state simulation from each of the child nodes until the simulation state obtained by simulation satisfies a pre-set second termination condition, and let the node with a maximum simulation distance among all the nodes corresponding to the simulation state as a current termination node;

step 223, tracing back to a father node in sequence starting from the current termination node until the starting node is reached, and determining that a sequence composed of all the nodes from the starting node to the current termination node is a current main branch;

step 224, determining whether the simulation state corresponding to the current termination node reaches the target state, and if so, proceed to step 226; if not, proceed to step 225;

step 225, selecting a node as the root node in the current main branch, and returning to step 221; and step 226, let the termination node the target node, and traversing the target node to all nodes of the starting node.

6. The robot state planning method based on a Monte Carlo tree search algorithm according to claim 5, wherein the length from the starting node to the end node is a first length, and the length of the current main branch is a second length, and the step 225 comprises:

step 2251, sequentially selecting a current node in the main branch as the root node in the order from the current termination node to the starting node;

step 2252, for each determined root node, performing steps 221 and 222 in turn to obtain a new termination node;

step 2253, determining whether the first length corresponding to the new termination node is greater than the second length, and if so, updating the current termination node as the new termination node, and proceeding to step 223; if not, returning to step 2251.

7. The robot state planning method based on the Monte Carlo tree search algorithm according to claim 1, wherein the extending the Monte Carlo tree using the Monte Carlo tree search algorithm until the generated target node reaches the target state comprises:

step 231, taking the starting node as the root node, extending the nodes of the Monte Carlo tree to a nominal depth using a Monte Carlo tree search algorithm, and determining scores of all the nodes in the Monte Carlo tree according to a pre-set scoring rule; and step 232, determining an optimal child node of the root node according to the score of each node, making the optimal child node be the root node, returning to step 231, and iterating for a plurality of times until the state corresponding to the target node obtained by extension reaches the target state.

8. The robot state planning method based on the Monte Carlo tree search algorithm according to claim 7, wherein the extending the nodes of the Monte Carlo tree to the nominal depth using the Monte Carlo tree search algorithm comprises:

recursively selecting child nodes downwards from the root node until a cutoff node, wherein the depth from the cutoff node to the root node is a third length, and then circularly performing state simulation starting from the cutoff node until the simulation distance reaches a fourth length, wherein the sum of the third length and fourth length is the nominal depth.

9. The robot state planning method based on the Monte Carlo tree search algorithm according to claim 8, wherein each node respectively corresponds to a moving step length and a static stability margin of the robot in a corresponding state, and the determining the scores of all the nodes in the Monte Carlo tree according to a preset scoring rule comprises:

determining a first average moving step length of all nodes obtained by state simulation, a second average moving step length and an average static stability margin of all nodes between the cutoff node and the root node, and a current moving step length of the cutoff node to a father node of the cutoff node according to the moving step length and the static stability margin of each node in the Monte Carlo tree;

carrying out weighted summation is carried out on the first average moving step length, the second average moving step length, the average static stability margin and the current moving step length to determine a reward value of the cutoff node; and tracing back and updating reward values of all nodes of the cutoff node to the root node back according to the reward values of the cutoff node, and determining a score of each node according to the reward values of each node respectively.

\* \* \* \* \*